US005993720A

United States Patent [19]

[11] Patent Number: 5,993,720

[45] Date of Patent: Nov. 30, 1999

Konuma et al.

[54] METHOD OF MANUFACTURING A CONTAINER

[75] Inventors: Ritaro Konuma, Shiki; Yoji Tanaka, Kawasaki, both of Japan

[73] Assignees: Kabushiki Kaisha Hosokawa Yoko; Kabushiki Kaisha Polymer Systems, both of Japan

[21] Appl. No.: 08/711,292

[22] Filed: Sep. 6, 1996

Related U.S. Application Data

[62] Division of application No. 08/535,961, Sep. 28, 1995, Pat. No. 5,593,066, which is a continuation of application No. 08/170,929, Dec. 21, 1993, abandoned.

[30] Foreign Application Priority Data

| | | | |
|---|---|---|---|
| Dec. 22, 1992 | [JP] | Japan | 4-92239 |
| Apr. 15, 1993 | [JP] | Japan | 5-25007 |
| May 28, 1993 | [JP] | Japan | 5-151135 |
| Aug. 31, 1993 | [JP] | Japan | 5-215602 |

[51] Int. Cl.$^{6}$ .......... B29C 45/00; B29C 45/16

[52] U.S. Cl. .......... 264/263

[58] Field of Search .......... 264/259, 263, 264/328.1

[56] References Cited

U.S. PATENT DOCUMENTS

| | | | |
|---|---|---|---|
| 1,909,726 | 5/1933 | Serenyi | 222/107 X |
| 2,833,444 | 5/1958 | Sherbondy | 222/95 |
| 3,206,074 | 9/1965 | Hoffmann | 222/94 |
| 3,323,682 | 6/1967 | Creighton, Jr. et al. | 222/94 |
| 3,817,427 | 6/1974 | Neff et al. | 222/107 |
| 3,874,558 | 4/1975 | Rockefeller | 222/92 |
| 3,922,099 | 11/1975 | Christine et al. | 222/107 X |
| 3,938,709 | 2/1976 | Collar | 222/95 |
| 3,959,429 | 5/1976 | Benning | 264/263 |
| 3,993,273 | 11/1976 | Cox | 222/1 |
| 4,262,819 | 4/1981 | Hayes | 222/92 |
| 4,293,520 | 10/1981 | Akutsu | 264/259 |
| 4,687,663 | 8/1987 | Schaeffer | 222/94 X |
| 4,732,299 | 3/1988 | Hoyt | 222/94 |
| 4,735,239 | 4/1988 | Salmon et al. | 141/25 |
| 4,844,917 | 7/1989 | DeLorimiere | 222/107 X |
| 4,867,208 | 9/1989 | Fitzgerald et al. | 141/18 |
| 4,964,538 | 10/1990 | Nimmey et al. | 222/92 |
| 5,123,571 | 6/1992 | Rebeyrolle et al. | 222/105 |
| 5,284,481 | 2/1994 | Soika et al. | 604/132 |
| 5,301,835 | 4/1994 | Fulks et al. | 222/95 |
| 5,305,920 | 4/1994 | Reiboldt et al. | 222/95 |
| 5,332,122 | 7/1994 | Herold et al. | 222/105 |

*Primary Examiner*—Christopher A. Fiorilla
*Attorney, Agent, or Firm*—Parkhurst & Wendel, L.L.P.

[57] ABSTRACT

A method for manufacturing a container having a tubular-shaped intermediate barrel portion that is covered with a flexible film. The tubular-shaped intermediate barrel portion is disposed on a mandrel that functions as a die core. The mandrel is installed with the tubular-shaped intermediate barrel portion to an upper die and a lower die. One end of the intermediate barrel portion covers the mandrel with flexible film. Molten polymer material is injected into the upper and lower dies, forming solid portions at opposite ends of the pipe-shaped barrel portion.

2 Claims, 25 Drawing Sheets

METHOD OF MANUFACTURING A CONTAINER

This is a divisional application of U.S. Ser. No. 08/535,961, filed Sep. 28, 1995, now U.S. Pat. No. 5,593,066, which in turn is a continuation of U.S. Ser. No. 08/170,929, filed Dec. 21, 1993, now abandoned.

BACKGROUND OF THE INVENTION

1. Field of the Invention

This invention relates to a container for accommodating fluidized substances, such as viscous fluid, liquid and powder, for example, method of manufacturing this container, and, in case that this container is a cartridge container for a discharge gun, a jig to install this cartridge container.

2. Description of the Prior Art

Conventionally, there is a cartridge container for a discharge gun as shown in FIG. 1 or FIG. 2, as a container to accommodate fluidized substances, such as viscous fluid, liquid, and powder, for example.

A cartridge container 1 shown in FIG. 1 is constituted as follows. Namely, a movable base plate 1*b* is provided slidably along an inside portion of a back end of a pipe-like main body 1*a* base plate 1*a* being constituted by comparatively hard resin. A discharge-opening-portion 1*c* which has a discharge-opening-portion 1*c*' is formed by the tip section of main-part 1*a*. A lid body 1*d* which closes the discharge aperture 1*c'* is screwed to the discharge-opening-portion 1*c*. The fluidized substance discharged from a discharge gun, for example, adhesive, is accommodated inside thereof.

The above-mentioned cartridge container 1 is used as shown in FIG. 3. Namely, the lid body 1*d* is removed from the discharge-opening-portion 1*c*. A nozzle N is screwed and fixed. The cartridge container 1 is inserted in a cylinder C of a discharge gun, and the movable-base-plate 1*b* is pushed forward by a piston P. Thus, adhesive is discharged from the nozzle N.

Moreover, a cartridge container 2 shown in FIG. 2 is constituted as follows. Namely, a thin film which has pliability is formed in the shape of a pipe, and forms a main-body 2*a*. One end of this main-body 2*a* is sealed by a clamping-ring 2*b* which consists of a thick metal line, then, adhesive is filled up inside of main-body 2*a*. After that, the other end of main-body 2*a* is sealed by the clamping-ring 2*b*.

This cartridge container 2 is, in the state where the end which touches one clamping-ring 2*b* is cut, inserted in the cylinder of the discharge gun with a nozzle. The other end of the cartrige container 2 is pushed by the piston P. Adhesive accommodated in the cartridge-container 2 is discharged in that way from the discharge gun.

There are following strong points and following faults in the above-mentioned conventional cartridge containers 1 and 2. Namely, since the main-part 1*a* has high rigidity, it is easy to deal with the cartridge container 1 of FIG. 1. However, on the other hand, when discarding it, although the inside of the main-part 1*a* is empty, it is discarded in the state where its cylindrical shape is maintained. For this reason, there is a problem that a lot of scrapped materials are made. On the other hand, the main-body 2*a* is crushed as internal adhesive is used in the cartridge container 2 of FIG. 2. And, it becomes a small lump in case it is discarded. Therefore, the problem of scrapped material is mitigated. However, if one end of main-body 2*a* is cut upon using, the main-body 2*a* loses its rigidity. For this reason, it is difficult to handle.

When the main-body 2*a* is grasped by a hand, adhesive floods outside from the main-body 2*a* with the pressure. It adheres to the hand or the discharge gun.

Moreover, there is a container for enclosing a powder-like object, which is weak to humidity, such as powder coffee, among the containers for accommodating fluidized substances.

Such a container must consist of material from which the container itself does not let humidity pass. For this reason, a glass container, a metal can, or a plastic container formed by the blow molding is used.

Since glass material lets neither humidity, nor oxygen pass, the glass container excels in the dampproofing capability or the gas cut-off capability. For this reason, the glass container is rich in keeping capability. However, the original form is maintained also after use and the glass container has heavy weight. For this reason, it is difficult to dispose of it due to its weight or volume. Similarly, the used metal can is difficult to dispose of due to its weight or volume.

Moreover, the blow-molded plastic container can overcome the difficulty in weight or volume which the glass container and the metal container have at the time when the used containers are discarded. However, the present blow molding technique cannot make the blow-molded plastic container of a thickness less than about 0.7 mm. Moreover, when moisture resistance capability and gas cut-off capability are taken into consideration, the blow-molded plastic container is limited to the co-extruding blow molding product in which polyethylene, polypropylene, etc., are used together with barrier base materials, such as the ethylene vinyl alcohol copolymer which is synthetic resin material. It is hard to perform the blow molding by synthetic material of resin material and metal material, such as aluminum, by the present blow molding technique.

Therefore, a plastic container fabricated in the shape of a pouch using plastic lamination film as a material which excelled in the dampproofing capability or the gas cut-off capability, is developed. This kind of plastic container uses, as a plastic lamination film, material which is rich in the dampproofing capability or the gas cut-off capability, so that the difficulty in the dampproofing capability or the gas cut-off capability can be overcome. Moreover, by the flexibility which the plastic lamination film possesses, the plastic container can be changed into a compact form. For this reason, the difficulty in weight and volume, which the glass container and the metal can possess, is also overcome from the viewpoint of a waste disposal.

The whole weight of a pouch shaped plastic container is light, and the volume after use decreases. For this reason, the problem in the viewpoint of the waste disposal at the time when a used container is discarded, is overcome. However, it is rich in a flexibility since the plastic lamination film is used as a material, in a pouch shaped plastic container. The plastic lamination film lacks the stability of form as a container. When the container is opened, contained substance is taken out, and thus the quantity of the content substance remaining in the container decreases, the bottom shape of a container becomes unstable. For this reason, there is a difficulty that extraction of contained content is troublesome even if a spoon is used for extraction of the content object remaining in the bottom of the container.

Moreover, as a container for accommodating fluidized substances, there is, for example, a liquid container used for filling up with liquid, such as drink water and oil for industry. The gusset type liquid container is known as this type of liquid container using flexible film as the material.

This type of the gusset type liquid container is produced as follows. Namely, one pair of gusset portions and one pair of surface sections for which the flexible film is used as a material, are prepared. Each gusset portion is folded into two portions at the central part in the width direction. Each of folded gusset portions is arranged between the overlapped surface sections so that the side ends of each of gusset portions may match to the side ends of each of the surface section. The side ends of each of the surface sections and the side ends of each of the gusset portions opposed to the side ends of each of the surface sections, the upper and lower ends of each of the surface sections and the gusset portions opposed to each other, and the upper and lower ends of the surface sections opposed to each other, are respectively heat-sealed to each other. A pouring opening is fixed on more internal side than the bending ends of the gusset portions at the upper end of the liquid container.

However, in the above liquid container, the pouring opening is fixed on more internal side than the bending ends of the gusset portions of the upper end of the liquid container. For this reason, the width of the surface sections have become greater, by the width of the pouring-opening portion, than the width of the gusset portions. Therefore, the liquid container becomes an elongated body on the whole. Such the liquid container has the problem of being unstable when it is exhibited in the state where it is filled with liquid and stands on a shelf.

Up to now, as a discharge gun for the cartridge container as shown in FIG. 1, used for adhesives, a gun which is shown in FIG. 4 is the most popular. This discharge gun 3 is provided with a grip 3*a*, a support section 3*b* which extends forward from the upper end of the grip 3*a* and has a half cylinder shape, and a lever 3*c* installed rotatably at the middle section of the grip 3*a*. If the lever 3*c* is pulled in the direction of an arrow shown in FIG. 4, a rod 3*d* moves forward. A press-plate 3*e* installed at the tip section of the rod 3*d* moves forward. In addition, a reference numeral 3*f* designates a short cylinder-like end board installed at the tip section of support section 3*b*, and has a horse shoe shape whose upper part, in view of the front side, is opened.

As shown in FIG. 5, the installation of the cartridge container 1 shown in FIG. 1 to the discharge gun 3 is performed. Namely, the nozzle N is screw-fixed to the discharge-opening-portion 1*c* instead of the lid body 1*d*. The nozzle N is placed on the support section 3*b* of the discharge gun 3. And, by pressing the movable-base-plate 1*b* by the press-plate 3*e*, and advancing it, adhesive filled up inside of the main-part 1*a* is discharged from the nozzle N.

The cartridge container 1 is discarded after use. However, the thickness of the main part 1*a* is large. For this reason, there is a problem of waste of resources. Moreover, the rigidity of the mainpart 1*a* is comparatively high. For this reason, in case it is discarded, there is a problem of being bulky.

For this reason, recently, the cartridge container 2 shown in FIG. 2 is used. Upon using, one end of the main-body 2*a* is cut out, and this cartridge container 2 is opened. A nozzle is mounted at the opened end and it is mounted on the discharge gun 1.

However, when the gun 3 is used in the state where the cartridge container 2 of FIG. 2 is installed to the discharge gun 3, the upper half of the support section 3*b* of the discharge gun 3 is opened widely, so that the upper part of the cartridge container 2 is not restrained. Moreover, since the main body 2*a* of the cartridge container 2 is formed of the thin film and rigidity of the main body 2*a* is low, when the cartridge container 2 is pushed by the press-plate 3*e*, the main-body 2*a* may swell and split.

For this reason, in the case of using the cartridge container 2, a special discharge gun is needed. The discharge gun 3 which is most popular now cannot be used. Although, from the viewpoint of saving resources, the cartridge container 2 is desirably used, there is a problem that the spread of such a container has not progressed.

SUMMARY OF THE INVENTION

A first object of this invention is to provide a container for a cartridge container for a discharge gun, and a manufacturing method of the container, which can reduce the amount of scrapped material after use, which is easy to deal with, which can prevent a contents therein from flowing out, and which can therefore prevent a contents therein from adhering to a hand or the discharge gun.

A first invention for attaining the above-mentioned first object is a cartridge container for single liquid type adhesive used for a discharge gun. In order to attain the above-mentioned object, the container has the following elements. A main body is formed by a flexible film in the shape of a pipe. And, at least the back end of the main body is closed. In order to hold form of the tip section of the main body, a reinforcing member is installed at the tip section. And, the reinforcing member has a discharge aperture for discharging the contents accommodated inside of the main body. A lid body closes the discharge aperture of the reinforcing member.

A second invention for attaining the above-mentioned first object is used for the discharge gun. And, it is a container for a cartridge which mixes two or more fluidized substances like a double liquid type adhesive, and discharges it. In order to attain the above-mentioned object, the container has the following elements. Each of two or more main bodies is formed by a flexible film in the shape of a pipe. At least the back end of each of the main bodies is closed. The main bodies are arranged in order with each other. In order to hold form of the tip section of each main body, two or more reinforcing members are installed respectively at the tip section of each main body. And, each reinforcing member has a discharge aperture for discharging the contents accommodated inside of each main body, respectively. One lid is engaged with each reinforcing member so as to combine each reinforcing member in one piece. And, the lid closes the discharge aperture of each reinforcing member.

The discharging of the fluidized substance filled in the main body, is performed by compression of the main body formed by the film according to the container of the above-mentioned first invention or second invention. It is easy to handle the main body since the tip section is held by the reinforcing member in a predetermined form. Moreover, it becomes possible to prevent the pressure from being applied to the main body by means of the reinforcing member.

A third invention for attaining the above-mentioned first object has the following elements. A main body has a pipe section and a board section formed at the end of this pipe section. The main body is formed of a flexible film. A reinforcing member is formed so that a discharge opening portion which has a discharge aperture may project therefrom. The reinforcing member is fixed, at its outer surface, onto the end of said main body in the state where the discharging opening portion is penetrated from the inner side through an insert aperture formed on an edge wall surface of said main body.

A fourth invention is the invention for manufacturing the container related to the above-mentioned third invention. In the manufacturing method which relates to this fourth invention, a film is folded and overlapped at its central part. The overlapped either-side sections of the film are adhered to each other to form a bag body which one end is closed and the other end is opened. The insert aperture to which the discharge opening portion of the reinforcing member is inserted, is formed at the one end at which the bag body is closed. The reinforcing member is inserted in the bag body from the opening section. After the discharge opening portion passes through the insert aperture, the front of the reinforcing member is fixed to the front of the bag body.

According to the container of the above mentioned third invention and the container manufactured by the manufacturing method of the fourth invention, the internal diameter of the main body is set to be slightly greater than the external diameter of the reinforcing member. For this reason, the reinforcing member is inserted in the main body easily. Moreover, even when the inner diameter of the main body is greater than the external diameter of the reinforcing member, wrinkles do not occur at the bottom. Therefore, the fluidized substance accommodated inside of the main body is not leaked from between the main body and the reinforcing member, though the bottom and the front of the reinforcing member are welded.

Each main body is formed of the thin film which has flexibility in the container for the cartridge for discharge guns of the above-mentioned first invention, the second invention or the third invention. The reinforcing member holding form of the main body, is installed at the tip section of the main body. Therefore, the following effect is obtained. Quantity of scrapped material after use decreases. Treatment is still easy. Unwanted flow of contents is prevented so that the contents do not adhere to a hand or the discharge gun.

Moreover, the main body and the reinforcing member are welded easily by the manufacturing method of the above-mentioned fourth invention. For this reason, the container for the cartridge for discharge guns is manufactured easily.

A second object of this invention is to provide a container and manufacturing method of this container, which can solve the problem of the waste disposal at the time of discarding a used container, which can secure the stability of form of a container, and which can take out the contents after opening briefly and certainly since the stability of form is secured.

The container of a fifth invention for attaining the above-mentioned second object, has the following elements. A pipe-like intermediate barrel portion is formed of a flexible film. An upper solid portion is formed of solid resin material. And, the upper solid portion is fixed to the upper end of the intermediate barrel portion. A lower solid portion is formed of solid resin material. And, a lower solid portion is fixed to the lower end of the intermediate barrel portion.

A sixth invention is the invention for manufacturing the container of the above-mentioned fifth invention. According to this manufacturing method of the sixth invention, the pipe-like intermediate barrel portion formed of the flexible film is coated on a mandrel which functions as a die core. The mandrel on which the intermediate barrel portion is coated is mounted on an upper die and a lower die. Melt-plastic resin material is poured, by an insert injection molding means, into the upper die and the lower die. The upper solid portion and the lower solid portion are formed in one piece at the end of the intermediate barrel portion.

The intermediate barrel portion is flexible in the container of the above-mentioned fifth invention. Thus, when the contents are vacuum-packaged, the vacuum degree of the container can be judged by the deformation of the container, for example, transformation of the intermediate barrel portion. The judgment of poor packing is easy.

According to the manufacturing method of the sixth invention, the upper solid section and the lower solid section are combined, by the insert injection molding means, into one body with the intermediate barrel portion, for which the film having flexibility is used as material. Thus, adhesion of the intermediate barrel portion and the upper solid section, and adhesion of the intermediate barrel portion and the lower solid section can be established without using adhesives. Wrinkles are not formed by the junction section of the intermediate barrel portion of the container. The form of the intermediate barrel portion is stabilized. The width of material selection of the film which constitutes the intermediate barrel portion, becomes wide. As the result, manufacturing of the container in accordance with the object of usage, becomes possible.

A third object of this invention is to provide a gusset type container, for which the flexible film is used as material, and a manufacturing method of this container, which is shaped in a cubic on the whole, which capacity efficiency is high, and which can maintain a stable condition when it is stood.

The container of a seventh invention for attaining the above-mentioned third object has a gusset type container main body as follows. One pair of surface sections for which the flexible film is used as material, are prepared. One pair of gusset portions each having a width almost equal to the width of the surface section, is prepared. These gusset portions are folded into two portions at its central part in the width direction. Each gusset portion folded into two portions, is arranged between the overlapped surface sections such that the side ends of the gusset portion, and each side end of the surface sections may be matched to each other. The side ends of the surface section, and the side ends of the gusset portion are heat-sealed to each other.

A V-shaped heat sealed portion which spreads at the angle of about 45 degrees on either side from the position on the axis in the longitudinal direction of the container main body at one end of the surface section of the container main body, and the cross heat sealed portion, which crosses the V-shaped heat sealed portion in the direction perpendicular to the axis of the longitudinal direction of the container main body, are formed. The portion located, at more end than the V-shaped heat sealed portion and the cross heat sealed portion of the container main body, is cut. A trapezoid heat sealed portion is formed at the end of the container main body. The zone including the central portion of the trapezoid heat sealed portion, is cut. Thereby, an opening portion is formed. A pouring opening is fixed to the opening portion.

An eighth invention is the invention for manufacturing the container of the above-mentioned seventh invention. In the manufacturing method of the eighth invention, one pair of surface sections for which the flexible film is used as material, and one pair of gusset portions whose width is almost equal to the width of the surface section, are prepared. These gusset portions are folded into two portions at its central part of the width direction. Each folded gusset portion is arranged between the surface sections which are overlapped such that the side ends of the gusset portion, and each side ends of the surface sections may be matched to each other. The side ends of the surface section, and the side ends of the gusset portion, are heat-sealed to each other. Thus, the gusset type container main body is formed. The V-shaped heat sealed portion, which spreads at the angle of about 45 degrees on either side from the position on the axis in the longitudinal direction of the container main body at the one end of the surface section of the container main body, and the cross heat sealed portion, which crosses the V-shaped heat sealed portion in the direction perpendicular to the axis of the longitudinal direction of the container main body, are formed. The portion, which is located at more end than the V-shaped heat sealed portion and the cross heat sealed portion of the container main body, is cut. The trapezoid heat sealed portion is formed at the end of the container main body. The zone including the central portion of the trapezoid heat sealed portion is cut. Thereby, the opening portion is formed. The pouring opening is fixed to the opening portion.

According to the container of the above-mentioned seventh invention, and the container manufactured by the manufacturing method of the eighth invention, a portion of the container is cut at more forward end than the V-shaped heat sealed portion and the cross heat sealed portion of the container main body. The trapezoid heat sealed portion is formed. The pouring opening is fixed to the opening portion formed by cutting the zone including the central portion of the trapezoid heat sealed portion. Thus, although, at least six folded seal portions are formed in the conventional method, the junction section of the container main body is triplicated at just four places in the present invention. Therefore, a stable seal is obtained. Moreover, the pouring opening is disposed at the end surface of the container whose profile is rectangular such that it covers the whole end surface.

A fourth object of this invention is to provide an installation jig for a cartridge container for discharge guns. When the cartridge container, having a main body is formed of a thin film, etc. in a condition where a spread type discharge gun is mounted thereon, is used, the jig can prevent the cartridge container from being torn. By this, the spread of the cartridge container can be promoted.

A ninth invention for attaining the above-mentioned fourth object has the following elements. A jig main body is formed in the shape of a pipe. A piston is inserted inside of the jig main body slidably.

In this case, it is desirable that a ring-like projection section is formed at the peripheral portion of both end surfaces of the piston. It is also desirable that the height of the projection portion gradually increases as it extends outwardly radially from the above mentioned piston.

The installation jig in the above-mentioned ninth invention is the installation jig for the container of the first invention, the second invention and the third invention. The piston is located at one end side of the jig main body. The container is inserted from the opening portion of the other end. In this case, the container is opened. A nozzle is mounted on the side end currently opened. And, the installation jig is installed to a support section of a discharge gun. The piston is pressed by a press plate of the discharge gun, and is moved forward to the other side. By this, adhesive filled in the cartridge container, is discharged from the nozzle.

Here, the whole outer circumference of the cartridge container is restrained by the jig main body. Therefore, the jig main body is not torn during usage. The container is crushed gradually from the piston side end portion. Here, in case that the projection portion is formed at the peripheral portion of the end surface of the piston, the cartridge container is crushed finely in a shape like an accordion. Almost all of the internal adhesive, etc. can be discharged efficiently. Especially, this tendency is remarkable when the height of the projection section becomes gradually higher as it extends outward. It can be prevented that a part of container formed of the thin film is involved into a space between the jig main body and the piston.

A tenth invention for attaining the above-mentioned fourth object is provided with a jig main body formed in a shape of a hollow cylinder. Two or more grooves are formed on the inner surface of the front end of the jig main body such that they may be prolonged toward the back end side in parallel with the direction of the axis of the jig main body.

According to the installation jig by the above-mentioned tenth invention, the container is installed by inserting the container into the inside of the installation jig from the front end side or the back end side of the installation jig. The container is installed to the discharge gun together with the installation jig. And, the jig main body of the container is compressed by the advance of the piston of the discharge gun. Contents are discharged from a nozzle.

In this manner, the jig main body of the container is compressed, so that the discharging of the contents is completed. At this time, the container, which has become a small lump, is taken out from the front end side of the installation jig and is exchanged. In this case, the contact area of the compressed container and the inner surface of the installation jig is diminished by the grooves formed on the inner surface of the installation jig. Therefore, the friction resistance decreases. Thus, the extraction of the container becomes easy.

The following effect is obtained by the installation jigs of the above-mentioned ninth and tenth inventions. Namely, it can be effectively prevented that the cartridge container is torn, even if the cartridge container, which the main body is formed of the thin film, is used with respect to the discharging gun of the spread type. The spread of the cartridge container is promoted. As a result, saving resources can be attained.

DETAILED DESCRIPTION OF THE PREFERRED EMBODIMENTS

The following is explanation of the embodiment of each invention based on the drawings.

Figure 6:
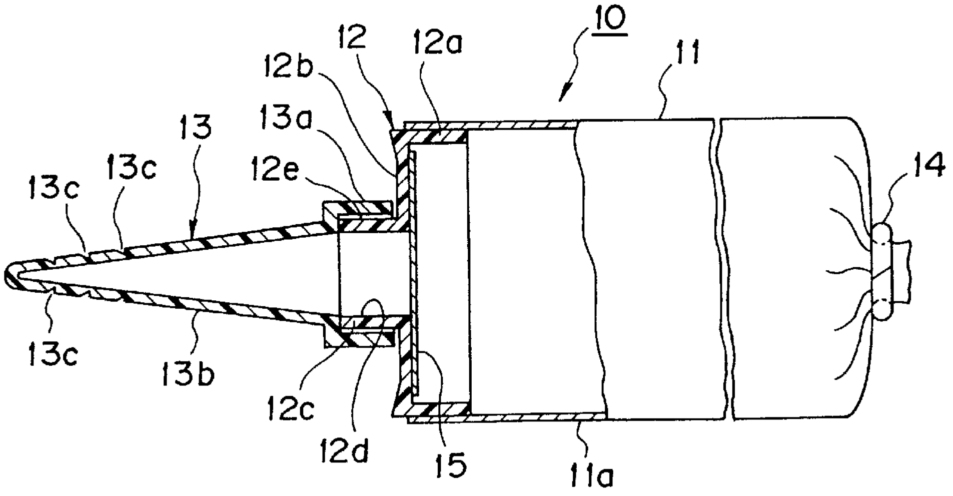
FIG. 6 is a partially omitted side view of one embodiment of a first invention.

FIG. 6 is an example in case this invention is adapted to a cartridge container. FIG. 6 is a partially broken side view of a cartridge container 10. As shown in FIG. 6, the main constitution elements of the cartridge container 10 are a main body 11, a reinforcing member 12 and a lid 13.

The main body 11 is constituted such that a film 11*a* which has pliability is formed in the shape of a pipe. The main body 11 may be formed in the shape of a pipe without a joint by an extruding molding, etc. However, the film 11*a* is rounded in this embodiment. One side section and the other side section are overlapped, and one side section and the other side section are bonded or fused, so that the main body 11 is formed in the shape of a pipe.

A single layer structure may be sufficient as the film 11*a*. However, as shown in FIG. 8*a*, four layers structure, which is constituted by laminating polyester film t, polyethylene film u, aluminum foil v and polyethylene film w arranged one by one toward the outside from the inner side, is employed. Of course, other laminated structures may be employed. Thin film made from other materials may be laminated. In addition, if the pliability and quantity of scrapped material at the time of being discarded are taken into consideration, the thickness of the film 11*a* is desirably not more than 200 micrometers. In this embodiment, the thicknesses of the above-mentioned four layers, are set respectively to be 12 micrometers, 15 micrometers, 7 micrometers, and 50 micrometers. The thickness of the film 11*a* is set to be 84 micrometers.

The back end of the main body 11 is squeezed at its central part, and it is banded together by a clamping ring 14 which is made of a thick wire. In addition, the union by the clamping ring 14 is performed after filling the inside of the main body 11 with the contained content, which has fluidity, such as adhesives, as mentioned later.

Figure 7:
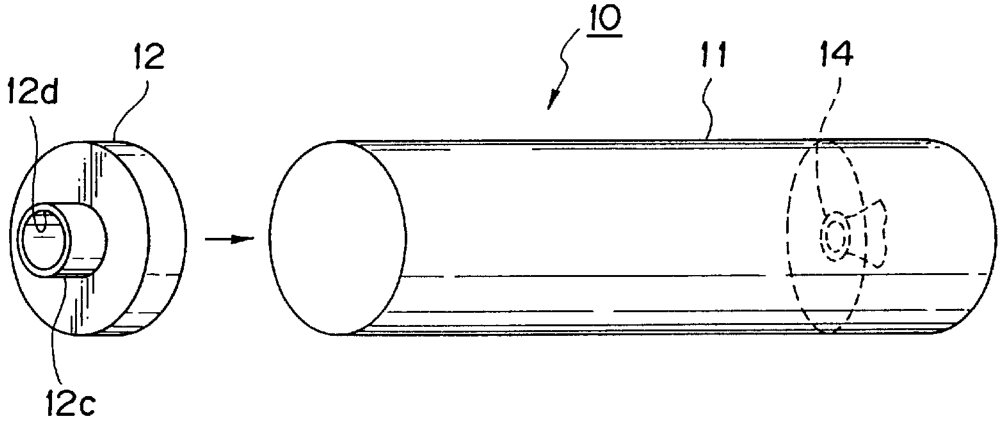
FIG. 7 is a perspective view showing an insertion state of a cartridge container to the main body of a reinforcing member.

On the other hand, as shown in FIG. 7, a reinforcing member 12 is fixed to the inner circumference side of the tip section of the main body 11 by means such as adhesion.

The reinforcing member 12 is formed from hard resin. The reinforcing member 12 has physical strength which does not change shape even when an external force is applied thereto. The reinforcing member 12 includes a short cylinder section 12*a* fixed to the inner circumference side of the tip section of the main body 11, a roof board section 12*b* formed at the tip of the short cylinder section 12*a*, and a discharge-opening-portion 12*c* formed so that it projects outward from the central part of the roof board section 12*b*. A discharge aperture 12*d*, which penetrates from the tip of the discharge-opening-portion 12*c* to the back end of the roof board section 12*b*, is formed at the central part of the short cylinder section 12*a*. The discharge aperture 12*d* is covered with a seal 15 stuck on the back end side of the roof board section 12*b*. Moreover, a male screw 12*e* is formed on the outer-circumference surface of the discharge-opening-portion 12*c*.

A lid 13 is formed from translucent and comparatively hard resin. The lid 13 has a lid section 13*a* which is screw engaged with a male screw 12*e*, and a nozzle section 13*b* of circular cone shape formed in one body with the lid section 13*a*. The tip section of the nozzle section 13*b* is closed. The lid section 13*a* is screwed to the male screw 12*e* of the reinforcing member 12, and when it is screwed tightly, the discharge aperture 12*d* is closed. However, at the time of use, the tip section of the nozzle section 13*b* is opened by cutting. In this case, in order to perform cutting easily and selecting an opening radius suitably, two or more cut grooves 13*c* are annularly formed with a predetermined interval at the tip section outer circumference of the nozzle section 13*b*.

Filling of contents into the cartridge the 10 is performed as follows. Namely, contained content are filled up from the back end of the main body 11, after fixing the reinforcing member 12 to the tip section of the main body 11. Then, the back end of the main body 11 is closed by the clamping ring 14.

Figure 3:
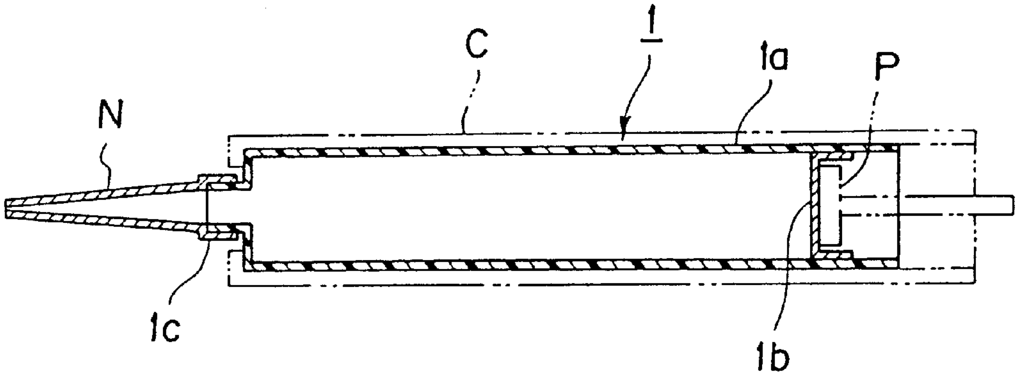
FIG. 3 PRIOR ART
FIG. 3 is a cross-sectional view in the state where the cartridge container of FIG. 1 is installed to the cylinder of the discharge gun.

Moreover, in case of using the cartridge container 10, the seal 15 is torn after removing the lid 13. After that, the lid body 13 is attached thereto and the nozzle section 13*b* of the lid 13 is cut at one of those cut grooves 13*c*. And, contained content of proper quantity, etc., can be discharged from the nozzle section 13*b* by inserting the cartridge container 10 to a cylinder of a discharge gun, and by pushing the back end with a piston in the same manner as the case of FIG. 3.

The above-mentioned cartridge container 10 is formed of the film 11*a* so that the main body 11 has pliability. However, even after opening the nozzle section 13*b*, by installing the reinforcing member 12 at the tip section of the main body 11, the treatment of the cartridge container 10 becomes easy. Moreover, if the portion of the reinforcing member 12 is grasped, pressure at the time of being grasped does not act on the inside of the main body 11. Therefore, the content accommodated inside of the main body 11 does not flow out from the nozzle section 13*b*.

Since the main body 11 comprises the film 11*a*, quantity of scrapped material decreases. Moreover, the main body 11 is compressed gradually in the longitudinal direction as contained content is discharged, and it becomes a small lump after use. Therefore, conveyance of scrapped material and disposal become easy.

Figure 9:
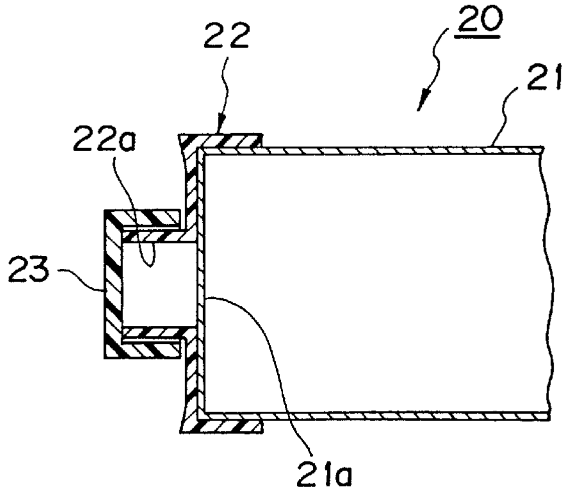
FIG. 9 is a cross-sectional view of a principal part of another embodiment of the first invention.

Another embodiment of the cartridge container of this invention is shown in FIG. 9. A cartridge container 20 of this embodiment is formed as follows. Namely, an end surface 21*a* is formed at a tip section of a main body 21, integrally or by means of fusing. Moreover, the tip section of the main body 21 is inserted into an inside of a reinforcing member 22, and is fixed. The tip section of the main body 21 is closed by the end surface 21*a* in the cartridge container 20. Therefore, there is no necessity sticking the seal 15 separately as in the case of the embodiment of FIG. 6. In addition, since a lid 23 does not have a nozzle section, when the cartridge container 20 is used, the lid 23 is removed from a discharge-opening-portion 22*a*. A nozzle prepared separately is screwed to be fixed.

Figure 10:
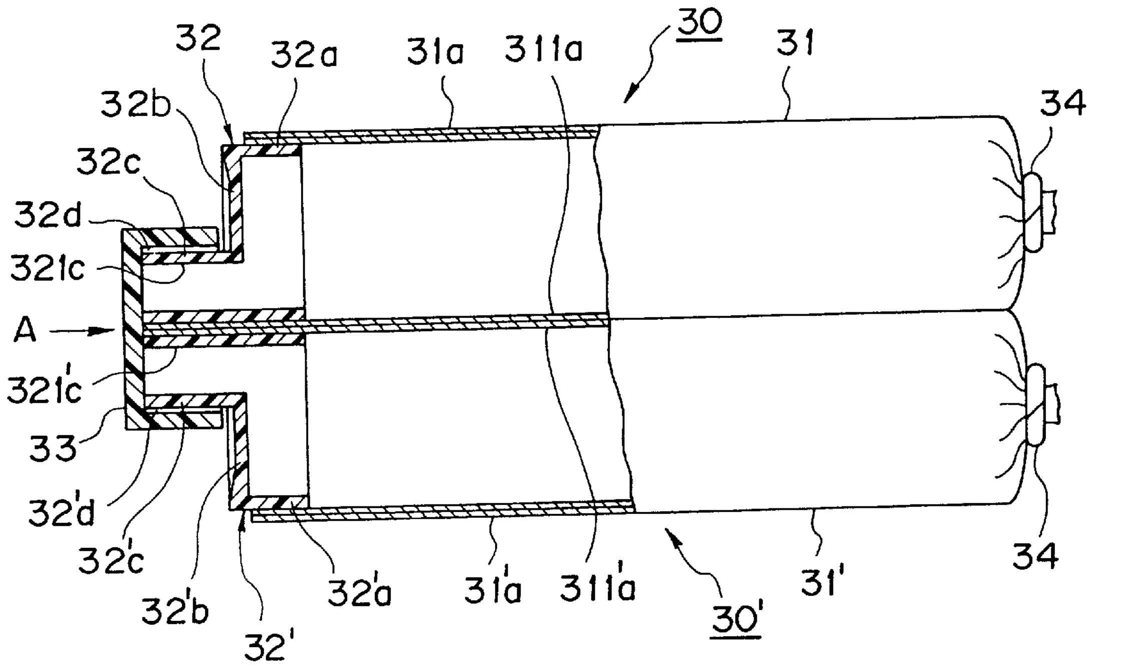
FIG. 10 is a partially-broken side cross sectional view of one embodiment of a second invention.
Figure 11:
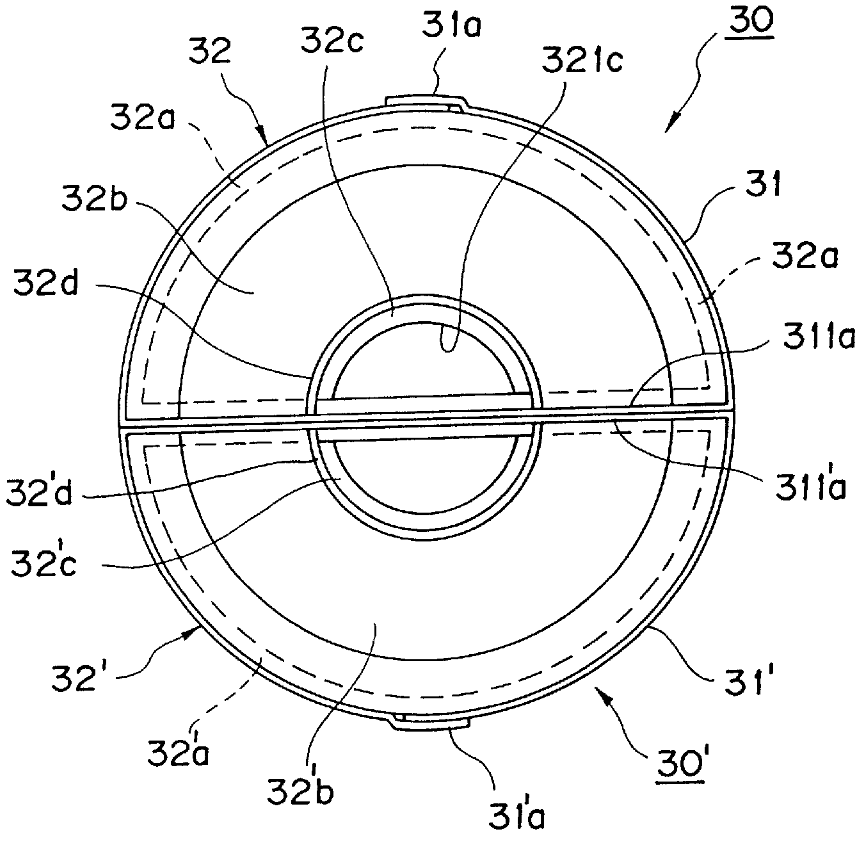
FIG. 11 is an enlargement view of FIG. 10 as viewed in an arrow A in the state where a lid body is removed.
Figure 12:
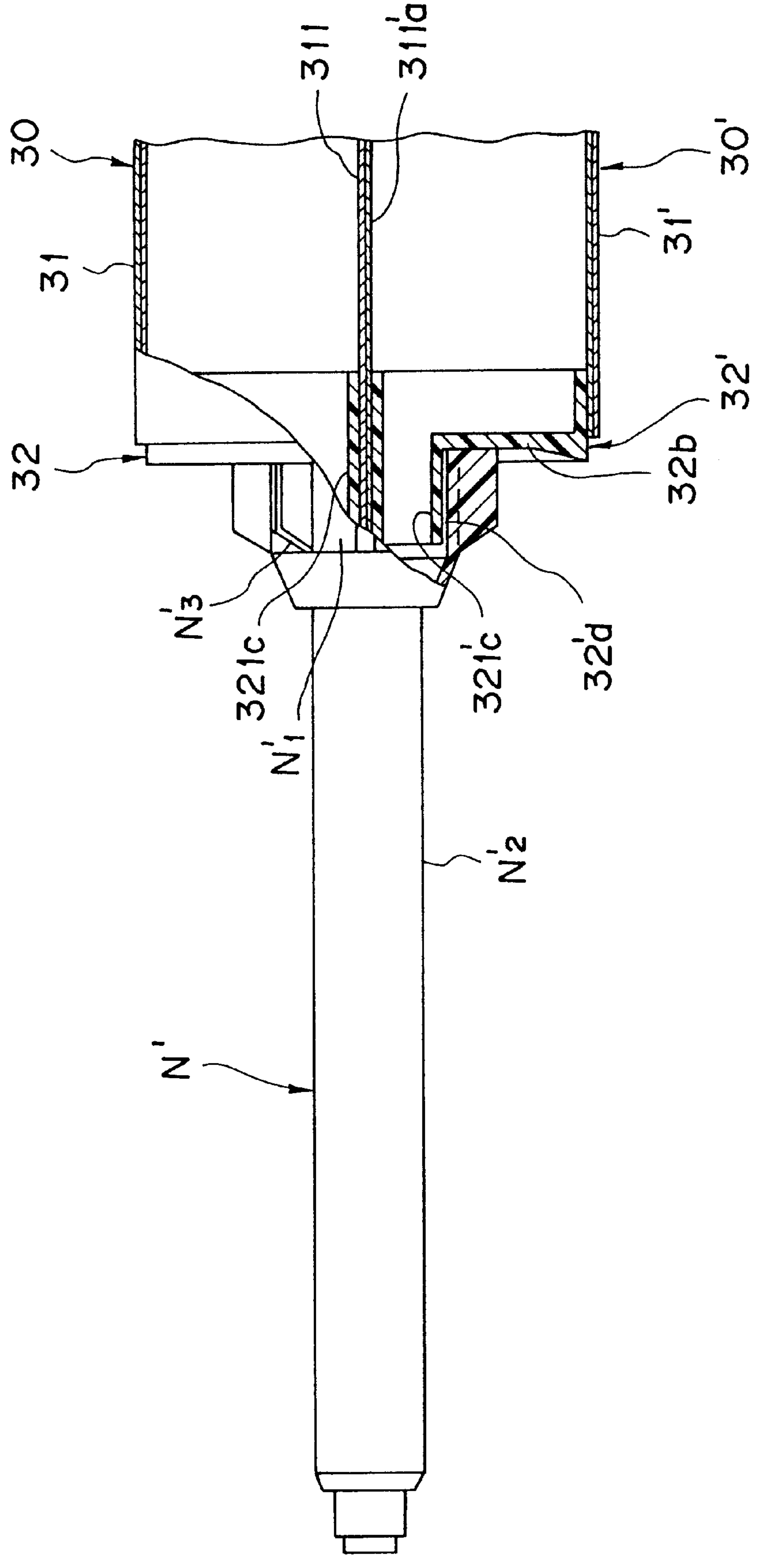
FIG. 12 is a partially-broken side cross sectional view in the state where a nozzle is attached to the container of FIG. 10.

Other embodiments of the cartridge container by this invention are further shown in FIG. 10 to FIG. 12. FIG. 10 is a side cross sectional view, from which a part of cartridge container is cut. FIG. 11 is a view as viewed in the direction of arrow A of FIG. 10 in the state where a lid 33 is removed.

This embodiment is a cartridge container for double liquid type adhesive.

In cartridge containers 30, 30' of this embodiment, main bodies 31 and 31' are respectively formed into a half cylinder shape, using films 31*a*, 31'*a* with pliability in the same manner as the above-mentioned embodiment. The back end of each main body 31, 31' is closed by a clamping ring 34 as in the above-mentioned embodiment.

Moreover, each of reinforcing members 32 and 32' consists of short cylinder sections 32*a*, 32'*a*, roof board sections 32*b*, 32'*b*, and discharge-opening-portions 32*c*, 32'*c* as in the above-mentioned embodiment. Each cross-sectional shape of the reinforcing members 32, 32' is formed in a half-circle shape as in the main bodies 31, 31'. Each discharge-opening-portions 32*c*, 32'*c* is formed at the central part of the bowstring side portion of the roof board sections 32*b*, 32'*b*. The cross-sectional form of the discharge-opening-portions 32*c*, 32'*c* is formed in a half circle shape, respectively. The bowstring side portion of each discharge-opening-portions 32*c*, 32'*c* is formed such that it is positioned on the same plane as the bowstring side portion of each of short cylinder sections 32*a*, 32'*a*, respectively. And, the outer-circumference surface of the short cylinder sections 32*a*, 32'*a*, and the bowstring side external surface and the bowstring side external surface of the discharge-opening-portions 32*c*, 32'*c* are covered with the films 31*a*, 31'*a*.

In the cartridge containers 30, 30' constituted as mentioned above, the cartridge container of cylinder form is formed, on the whole, by arranging bowstring side portions 311*a*, 311'*a* of the films 31*a*, 31'*a*, so as to be opposed to each other. At this time, the discharge-opening-portions 32*c*, 32*c*' touch to each other through the bowstring side partials 311*a*, 311'*a* of the films 31*a*, 31'*a*.

Male screws 32*d*, 32'*d* are formed respectively on the outer-circumference sides of the discharge-opening-portions 32*c*, 32'*c*. When the cartridge containers 30, 30' are arranged by uniting the backs with each other as mentioned above, these male screws 32*d*, 32'*d* constitute one screw section which continues on the whole. And, by screwing and binding the lid body 33 tightly to the screw parts 32*d*, 32'*d*, which continue to each other, the reinforcing members 32 and 32' are fixed in one piece, so that the main bodies 31 and 31' are unified. Moreover, discharge-apertures 321*c*, 321'*c* respectively formed on the discharge opening portions 32*c*, 32'*c*, are covered by the lid 33.

Contents, such as adhesives, are filled up from the back end of each main bodies 31, 31' in the state where the lid body 33 is screwed to the screw parts 32*d*, 32'*d*. After that, the back end of each main bodies 31, 31' is closed by the clamping rings 34 and 34'. This operation is the same as that of the above-mentioned embodiment.

As shown in FIG. 12, a nozzle N' for mixture is screwed to the screw parts 32*d*, 32'*d*, and is fixed to it, after removing the lid 33, when using the cartridge containers 30, 30'. In addition, the nozzle N' for mixture is constituted by a base section N' 1, which is screwed to the screw sections 32*d*, 32'*d*, and a cylindrical section N'2 follows the base section N'1. The nozzle N' for mixture is screwed in until the end surface of base section N'1 abuts against the roof board sections 32*b*, 32'*b*. In this case, two or more ribs N'3 are formed, which are prolonged up to the end surface of the base section N'1 on the outer circumference of the base section N'1, in order to increase strength at the time when the base section N'1 is screwed. Moreover, many fins (not illustrated) are formed in the inner circumference surface of the cylindrical section N'2.

The cartridge containers 30, 30' are inserted into the cylinder of a discharge gun after the attaching nozzle N'. The back ends are pushed by a piston, so that contained content is discharged respectively from each discharge-apertures 321*c* and 321'*c*. Discharged contents are mixed by churning or stirring with the fins formed inside of the cylindrical section N'2, when passing through the cylindrical section N'2 of nozzle N', and is discharged from the tip section of the cylindrical section N'2.

In addition, though the lid 33 without a nozzle is used in the above-mentioned embodiment, the lid body with a nozzle may be used. However, in that case, if the contents accommodated in each of main body 31, 31' contact each other, they will solidify. For this reason, each of discharge-apertures 321*c*, 321'*c* need to be covered with a seal, etc.

When the combination of the contained contents mixed at the time of use is determined before-hand, two main bodies 31,31' are combined to form one unit with the lid 33 screw-engaging with screw parts 32*d*, 32*d*', so that the cartridge containers 30, 30' are not separated.

When the contents to be mixed from prepared contents of several kinds, are selected and used arbitrarily, the half-cylinder type lid, which suits an external form of the discharge-opening-portions 32*c*, 32'*c*, is prepared. The cartridge containers 30, 30' are sealed by the half-cylinder type lid body respectively and individually.

The way of attaching the nozzle N' for mixture at the time of use, etc., is the same as the case of the above-mentioned embodiment.

Moreover, in each of the above mentioned embodiments, two pieces of half-cylinder type cartridge containers are combined to be used. When three or more kinds of contents are to be mixed, three or more cartridge containers may be put together. In this case, according to the number of the cartridge containers to be put together, the cross-sectional form of a main body, a reinforcing member, and a discharge opening portion, are formed such that the central angle of a sector in cross sectional view of each container becomes an angle of $2\pi/n$.

Figure 13:
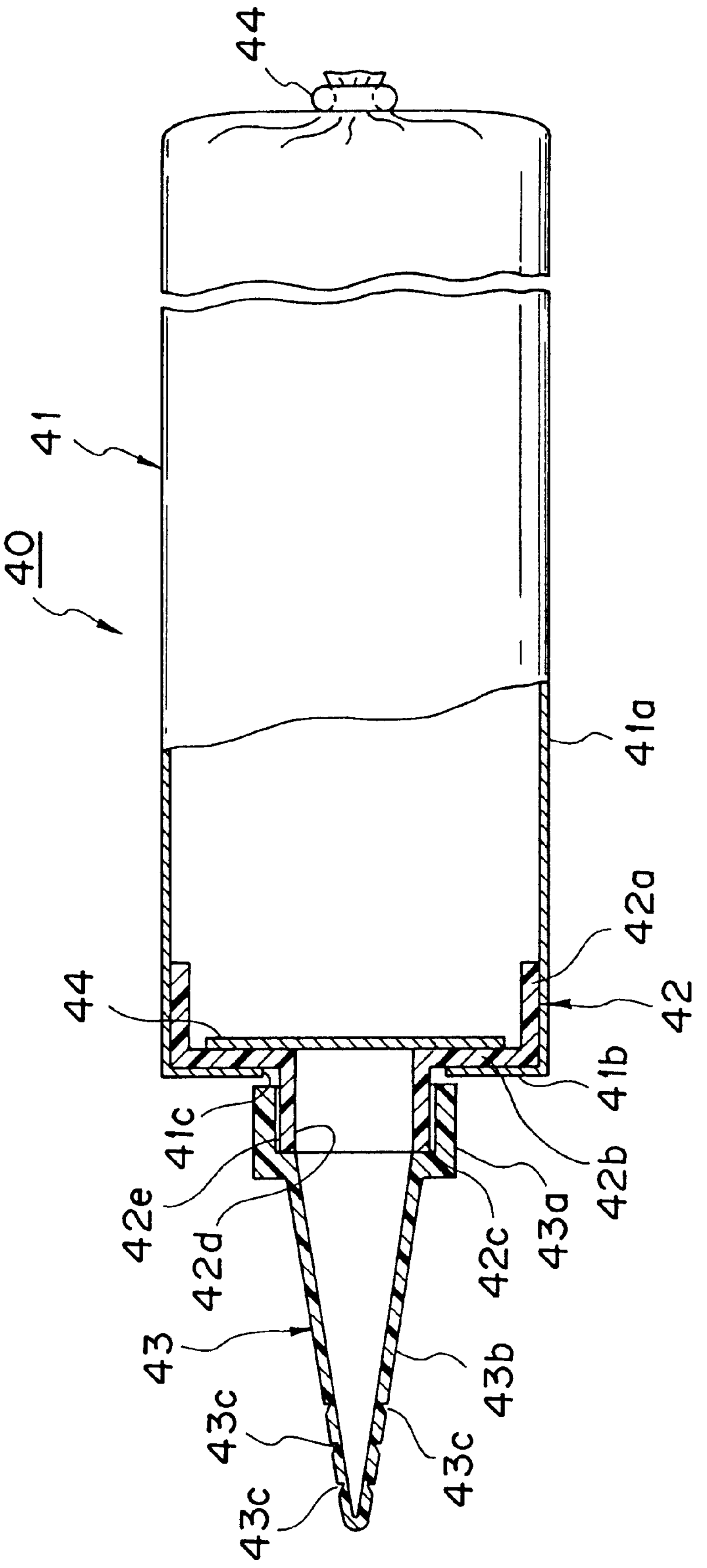
FIG. 13 is a partially-broken side cross sectional view of one embodiment of the container related to a third invention.
Figure 14:
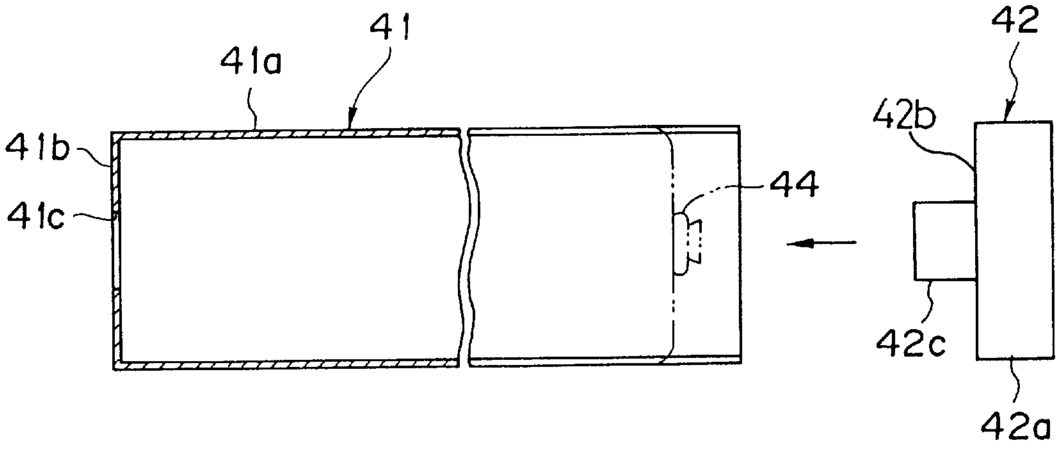
FIG. 14 is a side view in which the point of inserting the reinforcing member to the main body is shown.

Another embodiment of the cartridge container by this invention is further shown in FIG. 13 and FIG. 14.

FIG. 13 indicates a cartridge container 40 for discharge guns in this embodiment. This cartridge container 40 has a main body 41, a reinforcing member 42, a lid 43, and a clamping ring 44.

The main body 41 is formed of a film which has pliability. The main body 41 has a cylindrical section 41*a* which is in the shape of a cylinder, and a tip wall section 41*b* formed at the tip section of the cylindrical section 41*a*. An insert aperture 41*c* is formed such that it may communicate inside and outside at the central part of the tip wall section 41*b*. The back end of the main body 41 is squeezed and sealed at the central part. In this embodiment, the back end of main bodies 41 are bundled together by the clamping ring 44 formed of a thick wire. Although it is sealed by this manner, it may be sealed by means of welding.

Figure 8:
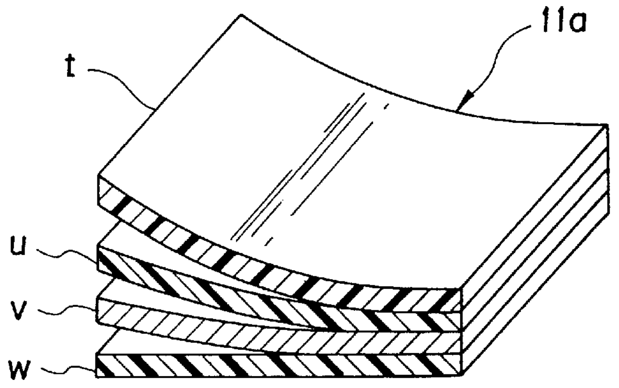
FIG. 8 is a cross-sectional view in which the structure of a film body is shown.

Single layer structure may be employed as the film which forms the main body 41. However, a four layer structure in which polyester film, polyethylene film, aluminum foil and polyethylene film are laminated so as to be arranged one by one toward the outside from the inner side, as shown in FIG. 8. Of course, other laminated structures are sufficient. Thin film of other materials may be laminated. However, as after-mentioned, for the welding of the main body 41 and the reinforcing member 42, the thin film of the most outer layer must be formed of material to which welding is impossible, and the thin film of the most inner layer must be formed of material to which welding is possible.

The reinforcing member 42 is formed from resin, which is hard and to which welding is possible with the most inner layer of the layers of the film composing the main body 41 (in this embodiment, polyethylene film is used). The reinforcing member 42 has physical strength which does not change its shape even when external force is applied. The reinforcing member 42 is provided with a short cylinder section 42*a*, which has a radius slightly smaller than the inner radius of the main body 41, a front wall section 42*b*, which is formed at the tip section of the short cylinder section 42*a*, and a discharge-opening-portion 42*c*, which is formed such that it projects at the central part of the front wall section 42*b*. The discharge-opening-portion 42*c* and the discharge aperture 42*d* which penetrates the front wall section 42*b*, are opened at the tip surface of the discharge-opening-portion 42*c*. This discharge aperture 42*d* is sealed with a seal 44 stuck on the rear surface of the front wall section 42*c*. A male screw 42*e* is formed at the outer-circumference surface of the discharge-opening-portion 42*c*.

As shown in FIG. 14, the reinforcing member 42 is inserted into the main-body 41 from the back end opening portion of the main body 41. The discharge-opening-portion 42*c* is inserted into the insert-aperture 41*c* until the front surface of the front wall parts 42*d* abuts against the tip wall section 41*b*. And, the front surface of the front wall section 42*b* is fixed at the tip wall section 41*b*. The main body 41 and the reinforcing member 42 may be bonded with each other. However, here they are welded. For example, a ring-like trowel is used for welding. The trowel is heated and is pushed against the area other than the tip wall section 41*b* of the external surface, so that welding is performed.

The lid 43 is formed from translucent and comparatively hard resin. The lid 43 has a lid section 43*a* which screws onto the male screw 42*e*, and a nozzle section 43*b* in the shape of a circular-cone formed in one body with the lid section 43*a*. The tip section of the nozzle section 43*b* is closed. Therefore, when the lid section 43*a* is screwed to the male screw 42*e* to be bound tightly, the discharge aperture 42*d* is closed. However, at the time of use, the tip section of the nozzle section 43*b* is opened by cutting. In this case, in order to perform cutting easily and selecting an opening radius suitably, two or more ring-like cut grooves 43*d* are formed at the tip outer circumference section of the nozzle section 43*b*.

The main body 41 is formed of film which has pliability. However, the reinforcing member 42, which has rigidity, is attached to the tip section of the main body 41. Thus, the cylindrical section 41*a* of the main body 41 can be held by hand. Thereby, the treatment becomes easy. Moreover, the reinforcing member 42 receives pressure applied to the main body 41 from a hand, at this time. Thus, the main body 41 is not crushed abruptly. Therefore, even after opening the seal 44 and the nozzle section 43*b*, the contained content accommodated inside of the main body 41 does not flow out carelessly from the nozzle section 43*b*.

Moreover, the main body 41 is formed of thin film. Therefore, it is crushed as it is used. And, after use, the main body 41 becomes a small lump, so that the quantity of scrapped material decreases, and the conveyance and the disposal of the main body 41 become easy.

Further when the tip wall section 41*b* of the main body 41 is attached to the reinforcing member 42, even if the inner diameter of the main body 41 is greater than the outer diameter of the short cylindrical section 42*c* of the reinforcing member 42, wrinkles are not generated at the tip wall section 41*b*. Thus, the fixation of the main body 41 and the reinforcing member 42 is possible in the state where the tip wall section 41*b* and the front wall section 42*b* contact each other over the whole region. Therefore, leakage of contents is certainly prevented.

Moreover, in case that the main body 41 and the reinforcing member 42 are welded, it is sufficient that the ring like trowel is pushed once as mentioned above. Thus, time required for welding is mitigated.

Apart from that, when the main body 41 and the reinforcing member 42 are welded, the main body 41 must not be welded to the trowel. Therefore, it is required to the main body 41 that the material of an outside and an inner side should differ from each other. It is desirable that film which constitutes the main body 41 has multiple layer structure. However, it is very hard to form the cylindrical section 41*a* of the main body 41 and the tip wall section 41*b* into one piece by use of the film of multiple layer structure. Therefore, the inventors of this application have studied hard, and have provided a manufacturing method which can easily manufacture the above-mentioned cartridge container.

FIG. 15 to FIG. 21 are explanatory views with respect to the manufacturing method of the above-mentioned cartridge container. In addition, the cartridge container manufactured by the manufacturing method explained below, is different from the cartridge container 40 of FIG. 13, only as for the main body, while other constitution elements are the same as those of the cartridge 40. Therefore, the same reference numerals are given to the same elements.

Upon manufacturing the cartridge container, a main body 51, the reinforcing member 42, and the lid 43 are manufactured first. In this case, the reinforcing member 42 and the lid 43 can be manufactured by known molding method, such as an injection molding. The main body 51 is manufactured as follows.

Figure 15:
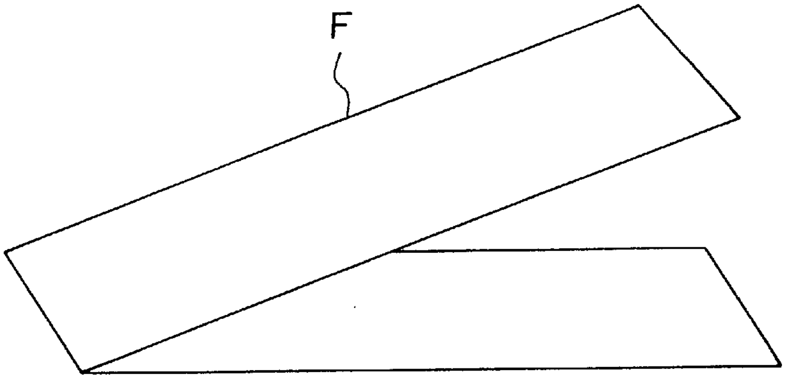
FIG. 15 is a perspective view in which the folding process in a fourth invention is shown.
Figure 16:
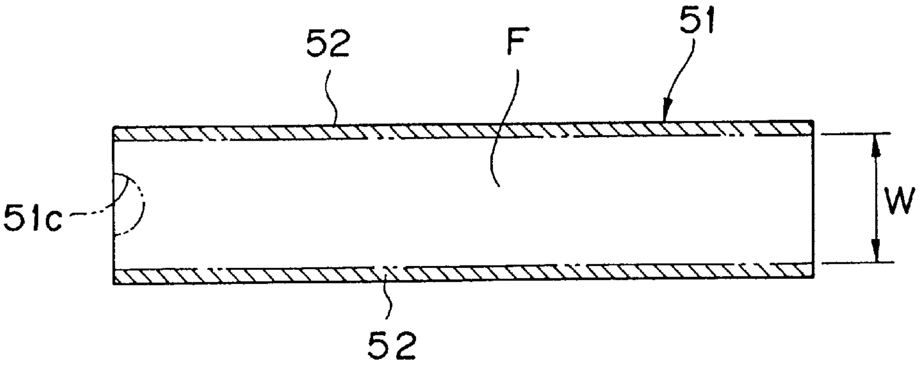
FIG. 16 is an explanatory view in which the main body in the state where the either-side section is welded after the folding process is shown.

Namely, as shown in FIG. 15, long and slender film F is folded at the central part of the longitudinal direction. Next, as shown in FIG. 16, the either-side section (portions to which the hatching are given) of the overlapped portions, is respectively fixed by means, such as welding (the melding sections are shown by a reference numeral 52). Thus, the main body 51 whose one end on the side of folding is closed and other end is opened, is formed in this manner. And, an insert-aperture 51*c* is formed at one end of the main body 51. In this case, the film F is overlapped. For this reason, a circular insert-aperture 51*c* is formed by clipping in the shape of a half-circle.

Figure 17:
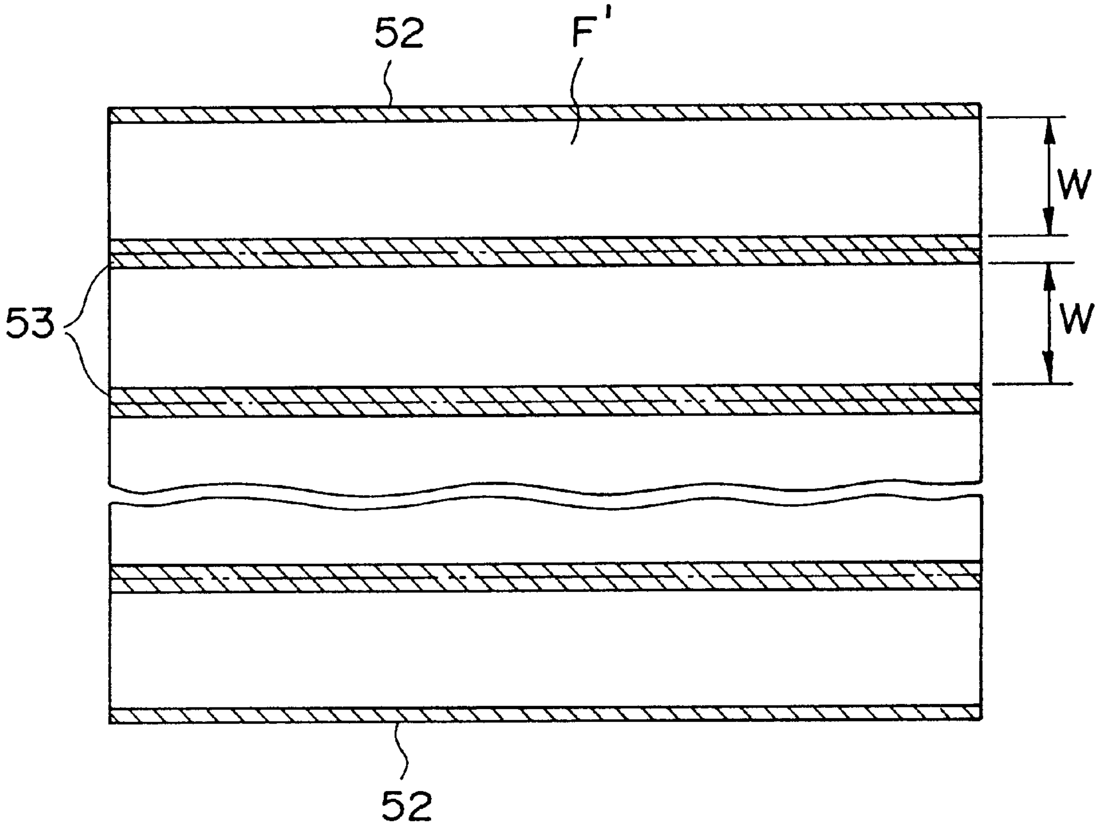
FIG. 17 is an explanatory view in which another example of the fourth invention is shown.

As shown in FIG. 17, the main body 51 is manufactured from broad film F'. In this case, the film F' is folded and overlapped. Both end portions are welded. Two or more intermediate places are welded along the both side sections. At this time, the width of non-welding portion is, of course, the same as that of the width W of the film F. Moreover, a width of a intermediate welding section 53 is increased two times of the width of the welding section 52 of either side. The central part of each welding section 53 is cut after welding, so that many main bodies 51 can be produced concurrently.

Figure 18:
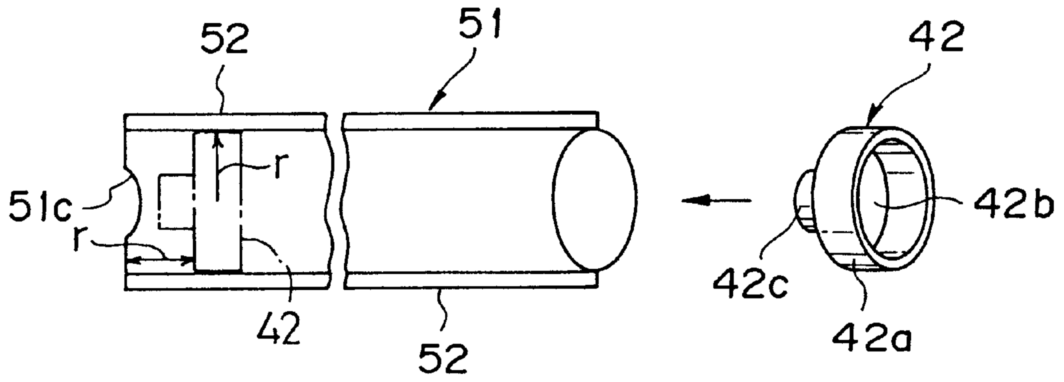
FIG. 18 is a perspective view in which the point of inserting the reinforcing member to the main body is shown.
Figure 19:
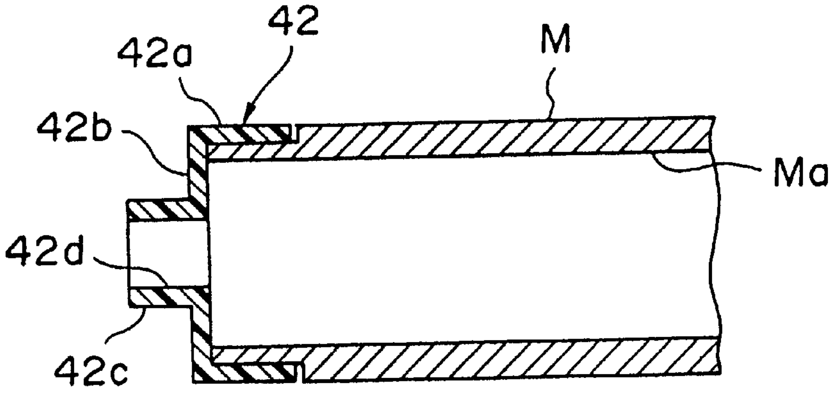
FIG. 19 is a side cross sectional view in which the state where the reinforcing member is inserted in the tip section of the mandrel is shown.

Next, as shown in FIG. 18, the reinforcing member 42 is inserted inside of the main body 51 from the opening section. In this case, as shown in FIG. 19, a tip section of a mandrel M is engaged to the short cylindrical section 42*a* of the reinforcing member 42. By supporting with the mandrel M, insertion becomes easy. Moreover, when the discharge aperture 42*d* of the reinforcing member 42 is sealed by the seal material 44 (refer to FIG. 13), it can be prevented that the reinforcing member 42 drops out from the mandrel M by carrying out vacuum suction from an aperture Ma of the mandrel M.

Figure 20:
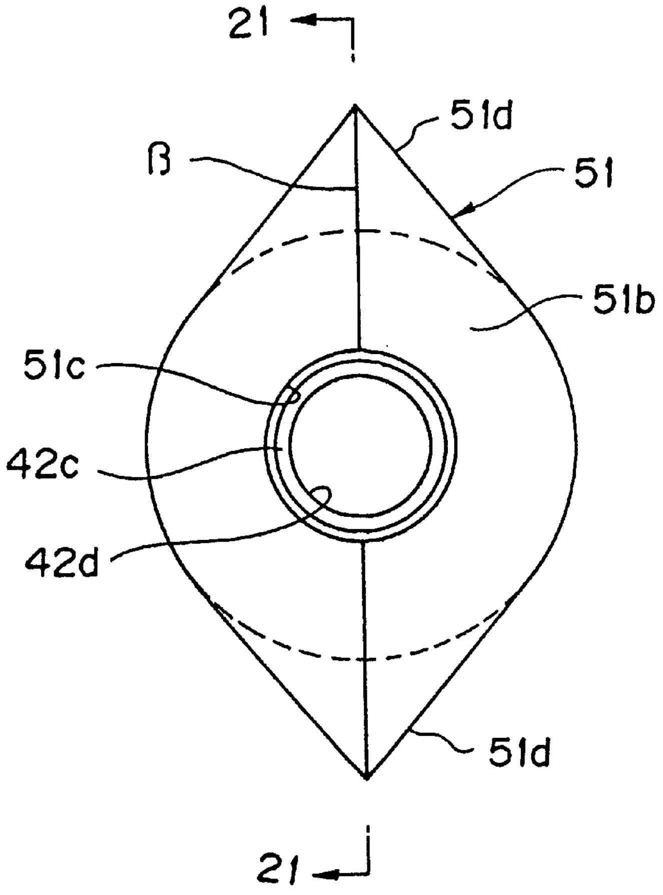
FIG. 20 is a front view of the main body in which the reinforcing member is inserted.
Figure 21:
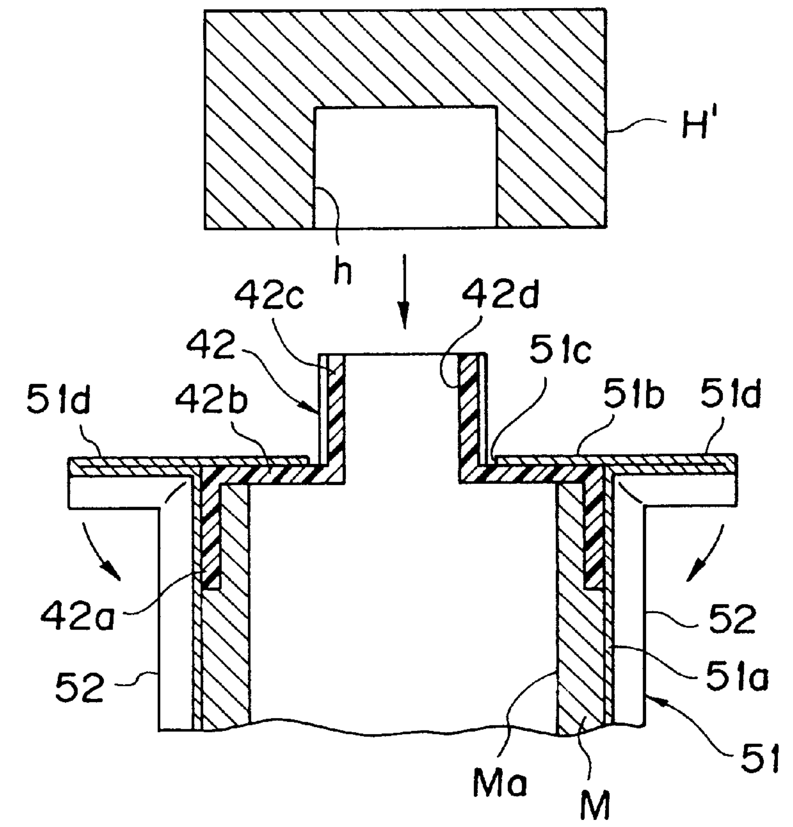
FIG. 21 is a cross sectional view taken along the line 21—21 in FIG. 20 in which the welding process of the main body and the reinforcing member is shown.

The reinforcing member 42 is inserted inside of the main body 51. And, when the reinforcing member 42 arrives at a position where a distance from the folded line p is equal to the radius r of the short cylindrical section 42*a* of the reinforcing member 42, it cannot advance any more (see FIG. 18). In this state, as shown in FIG. 20 and FIG. 21, the folded line β is extended along the diametrical line of the reinforcing member 42. At this time, the front surface of the front wall section 42*b* of the reinforcing member 42 contacts a bottom 51*b*. The cylindrical section 51*a* is formed by portion of the main body 51, which is directed to the opening side from a position where is separated from the folded section by a distance equal to the radius r of the reinforcing member 42. Moreover, the front portion of the main body 51 at the welding section 52, is projected outward in the radial direction of the member 42 to forms two ear sections 51*d*, 51*d*.

Next, a trowel H' is heated. As shown in FIG. 21, the trowel H' has the outer diameter almost the same as the outer diameter of the reinforcing member 42. And, the trowel H' has a concave-portion h, which has the inner diameter almost the same as the insert-aperture 51*c* at the tip surface, and whose depth is deeper than the projection height of the discharge-opening-portion 42*c*. The tip surface is pushed against the bottom 51*b*. The bottom 51*b* is welded to the front of the front wall section 42*b* of the reinforcing member 42.

In addition, by folding at the base end, the ear portion 51*d* meets the cylindrical section 51*a*. After the ear section 51*d* is made to meet the cylindrical section 51*a*, trowels H, H shown in FIG. 24, may be pushed against the ear portion 51*d*. In this manner, the inner circumference side of the cylindrical section 51*a*, and the short cylindrical section 42*a* of the reinforcing member 42 are welded. At the same time, films, which are located at the most inner side in the four layers structure of the film F constituting the ear section 51*d*, are fixed to each other, so that the ear section 51*d* does not become bulky.

Figure 22:
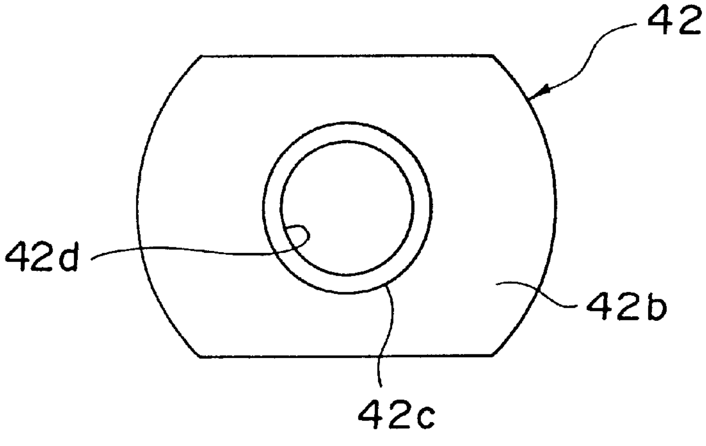
FIG. 22 is a plan view in which another embodiment of the reinforcing member is shown.

In addition, this invention is not limited to the above-mentioned embodiment. For example, the front wall section 42*b* of the reinforcing member 42 is circular in the above-mentioned embodiment. However, it may be oval, square, rectangle, or a shape which is formed by cutting both sides of a circle by straight lines, as shown in FIG. 22. Moreover, though the short cylindrical section 42*a* is formed in the reinforcing member 42, it may not be formed.

Figure 23A:
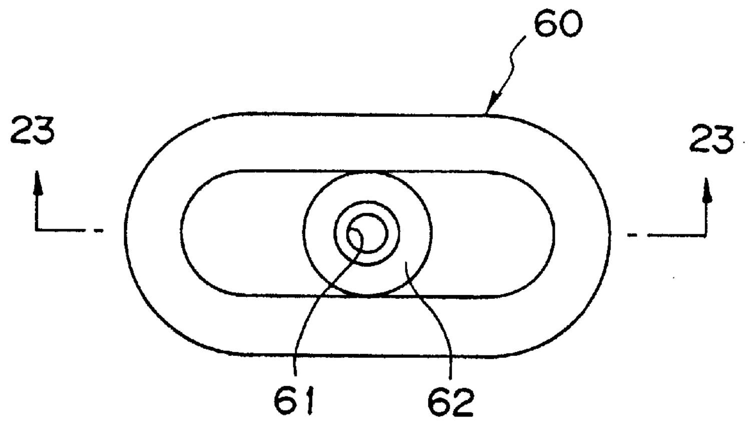
FIG. 23A is a plan view showing one example of a jig used when two containers are used as containers of two liquid mixed type, wherein (FIG. 23A) is a plan view, (FIG. 23B) is an under-surface view, and (FIG. 23C) is a cross sectional view taken along the line 23—23 in (23A)
Figure 23B:
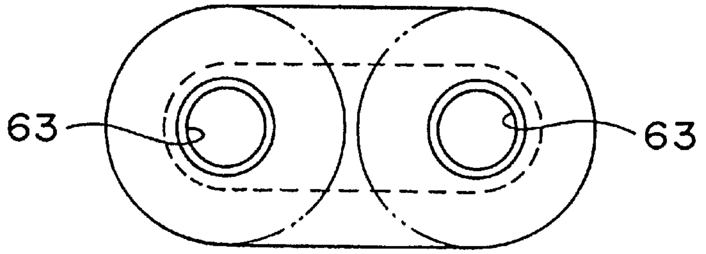
Figure 23C:
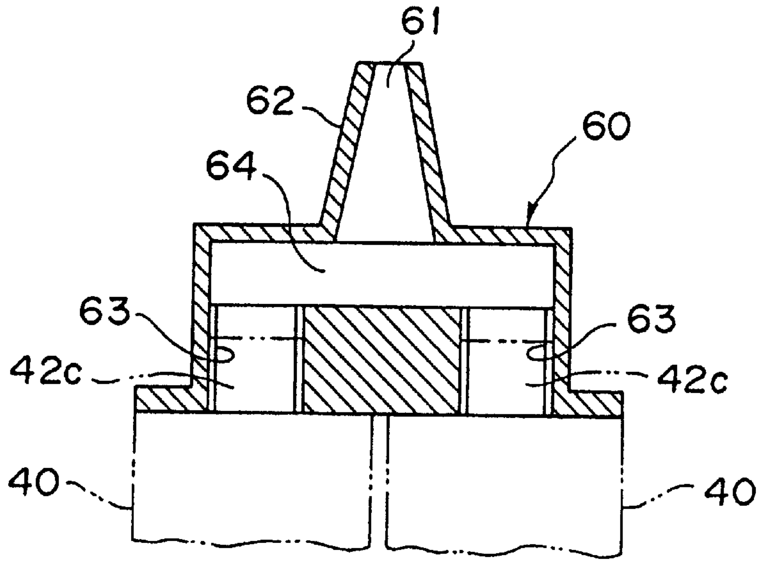

If two cartridge containers 40 and 40 are mounted on a jig 60 which is shown in FIG. 23C, they can be used as a cartridge container of a double liquid mixed type. Namely, a nozzle section 62 which has a nozzle aperture 61 is formed at the front section of the jig 60. On the other hand, screw apertures 63 and 63 which fix two discharge-opening-portions 42*c*, 42*c* to each other by means of screwing, are formed on the rear-surface section of the jig 60. Screw apertures 63, 63 are communicated to each other through a communication path 64. At the same time, those screw apertures 63, 63 are communicated with the nozzle aperture 61. When the jig 60 is used, each of cartridge containers 40, 40 is screwed and fixed to the screw apertures 63, 63. A pipe-like nozzle (not illustrated), which has fins for mixing inside, is mounted on the nozzle portion 62. When contained contents are discharged from the cartridge containers 40, 40, each of contained contents passes through the communication path 64 and the nozzle aperture 61, mixed in the nozzle, and then discharged out.

Figure 24:
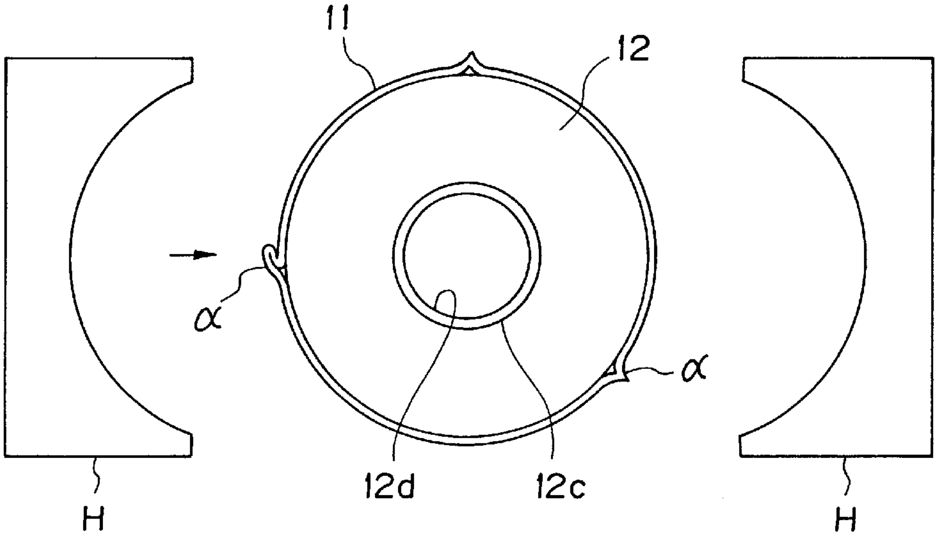
FIG. 24 is an expanded plan view in which a welding state of the main body of the container and the reinforcing member is shown.

In manufacturing the cartridge container 10 of FIG. 6 and FIG. 7, as shown in FIG. 24, when the main body 11 and the reinforcing member 12 are welded by pushing them at their engagement portions by the trowels H, H, which are heated, if the inner diameter of the main body 11 is extremely greater than the outer diameter of the reinforcing member 12, wrinkles a are formed at a part of the main body 11 as shown in FIG. 24. Therefore, this part is not welded. Thus, there is a possibility that contents leak from the parts where the wrinkles α are formed. Conversely, if the inner diameter of the main body 11 is less than the outer diameter of the reinforcing member 12, insertion of the reinforcing member 12 to the main body 11 becomes hard. Thus, there arises a problem that the improvement in accuracy of the inner diameter of the main body 11 and the outer diameter of the reinforcing member 12, becomes necessary, and that manufacturing cost increases.

Moreover, the whole of the main body 11 and the reinforcing member 12 are not welded only by pushing two trowels H, H from one direction. It is necessary to press trowels H, H, again from another direction which is perpendicular to the first direction of pressing. For this reason, there arises another problem that welding work takes time.

In case a main body and a reinforcing member are welded by the manufacturing method of the cartridge container by the above-mentioned embodiment, a wrinkle is not generated on the main body which is formed of film, and the welding work becomes easy.

Figure 25:
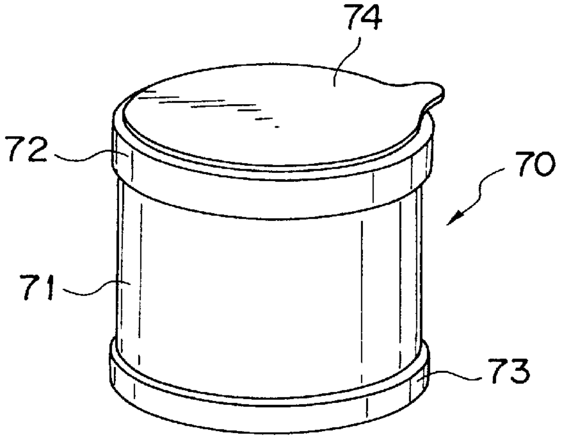
FIG. 25 is a perspective view of the container by a fifth invention.
Figure 26:
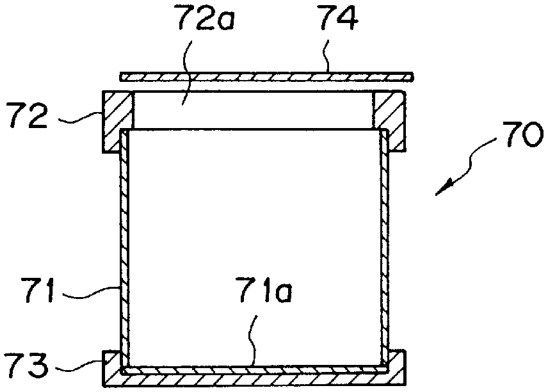
FIG. 26 is a side cross sectional view of the container of FIG. 25.

An example in case the present invention is adapted to a coffee container, is shown in FIG. 25 and FIG. 26. A coffee container 70 has the following elements in FIG. 25 and FIG. 26. An intermediate barrel portion 71 is formed of plastic lamination film. An upper solid portion 72 is formed in one piece with one end of the intermediate barrel portion 71. A lower solid portion 73 is formed in one piece with another end of the intermediate barrel portion 71. An opening-portion 72*a*, provided on the upper solid portion 72, is sealed by a lid 74. A lid is screwed by forming a screw section on the external surface of the upper solid portion 72.

As for the intermediate barrel portion 71, material which is formed by cutting plastic lamination film into a shape of rectangle, is used. The intermediate barrel portion 71 is formed in a cylindrical form in which both ends were opened, by joining the side ends of the material with each other so as to form a sealing shape of an envelope. The intermediate barrel portion 71 may be formed in a cylindrical form in which both ends are opened, by abutting side ends of the film against each other to bond each of inner surfaces of side ends of the film with each other. The end located at the bottom side of the intermediate barrel portion 71 made in this manner, is heat-sealed by usual heat seal means.

In consideration of dampproofing capability, a gas cut-off capability and flexibility, polyethylene film with thickness of 50 microns, polyester film with thickness of 12 microns, aluminum foil with thickness of 9 microns, and polyethylene film with thickness of 50 microns are desirably delaminated to form a plastic lamination film. Alternatively, polyethylene film with thickness of 50 microns, paper with thickness of 50 microns, aluminum foil with thickness of 9 microns, and the polyethylene film with thickness of 50 microns are laminated may be selected.

Manufacturing method of the coffee container 70 will be explained with reference to FIG. 27.

Since powder coffee enclosed in the coffee container 70 is apt to absorb humidity and the scent is apt to change, the dampproofing capability and the gas cut-off capability are required for the coffee container 70. Therefore, plastic lamination film which is rich in the dampproofing capability, the gas cut-off capability, and the flexibility, is selected as the intermediate barrel portion 71 which constitutes the coffee container 70. Moreover, material which is rich in the dampproofing capability and the gas cut-off capability, and the same material as the intermediate barrel portion 71, is selected for the upper solid portion 72 and the lower solid portion 73.

Figure 27:
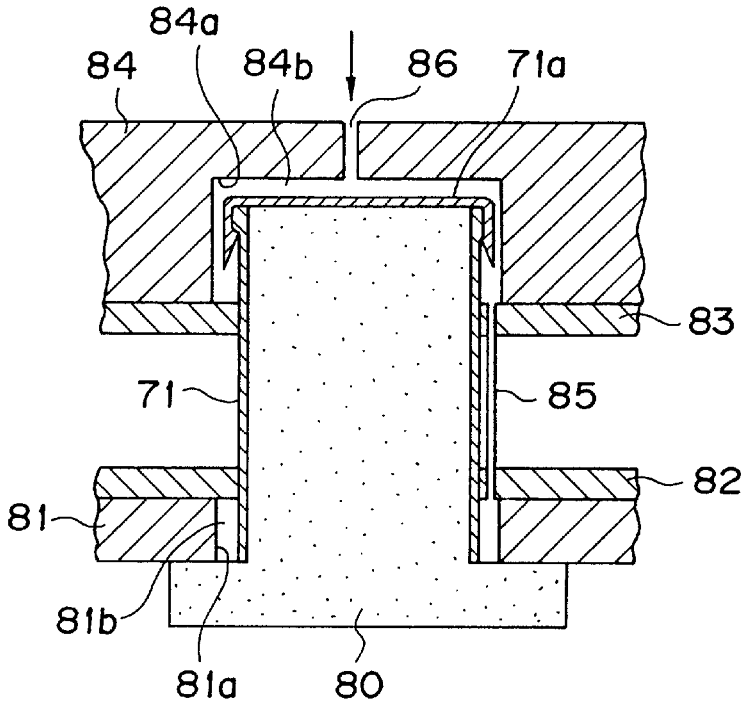
FIG. 27 is a sectional view in which the manufacturing method of the container by a sixth invention is shown.

In FIG. 27, the intermediate barrel portion 71 which is formed of the plastic lamination film selected by taking into consideration the dampproofing capability, the gas cut-off capability and the flexibility, and one end of which is opened, is covered on a mandrel 80 which functions as a die core, from the upper side. And, the upper end portions of the intermediate barrel portion 71 and the mandrel 80 are covered with a sheet 71*a* of the same material as the intermediate barrel portion 71. In this case, if the intermediate barrel portion 71 has a circular cross section, a circular mandrel corresponding to this will be used. On the other hand, if the intermediate barrel portion 71 has a rectangular cross-section, a rectangular mandrel corresponding to this will be used.

Subsequently, the mandrel 80 coated with the intermediate barrel portion 71, is inserted and mounted to an aperture 81*a* of a lower die 81 from the bottom. At this time, a molding space 81*b* having the same form as the upper formation portion 72 of the coffee container 70, is formed between the outer-circumference surface of the intermediate barrel portion 71 and the inner circumferential side of the aperture 81*a*. A middle portion higher than the lower die 81 of the mandrel 80 coated with the intermediate barrel portion 71, are held on the whole circumference thereof, by a lower side holding plate 82 and an upper side holding plate 83, which are disposed with a predetermined interval. Thereby, the molding space 81*a* surrounded by the mandrel 80, the lower die 81 and the lower side holding plate 82, is formed.

Next, the upper die 84 is installed to the tip portion of the mandrel 80 coated with the intermediate barrel portion 71, in a state where the tip portion of the mandrel 80 is inserted in a hole 84*a* of the upper die 84. At this time, a molding space 84*b* having the same form as the lower solid portion 73 of the coffee-container 70, is formed between the upper surfaces of the outer-circumference surface of the intermediate barrel portion 71, the inside wall surface of the hole 84*a*, and a bottom control plate 83. A molding space 84*a* and a molding space 81*b* are communicated with each other by a runner 85 prepared in the die.

When the setting of the intermediate barrel portion 71 to the upper die 84 and the lower die 81 is completed, synthetic resin material like polyethylene resin is poured in the state where it is melting, by the insert injection molding means, into the molding space 84*b* from a gate mouth 86 which is formed in the upper die 84. At the same time, the molten synthetic resin material poured in the molding space 84*b*, is also introduced into the molding space 81*b* through the runner 85. Thereby, the upper solid portion 72 and the lower solid portion 73 are combined into one piece with the intermediate barrel portion 71, so that the coffee container 70 is manufactured.

The bottom portion of the coffee container 70 thus manufactured, is covered with the same plastic lamination film as that of the barrel portion, whereby the seat 71*a* covers the bottom side of the intermediate barrel portion 71 in the manufacture process, as shown in FIG. 26. Therefore, by selecting, as plastic lamination film, film having an aluminum foil layer, dampproofing capability and gas cut-off capability are secured regardless of the quality of the material of composition resin material.

Since the intermediate barrel portion 71 is flexible, when vacuum-packaging is performed to the coffee container 70 manufactured as mentioned above, it becomes possible to judge the vacuum degree by a change in a form of a trunk section.

In addition, in the above-mentioned embodiment, since the bottom side of the intermediate barrel portion 71 is covered with the sheet 71*a* in the manufacture process, contained content and the lower solid portion 73 do not directly contact each other. The lower formation portion 73 may be exposed inside of a coffee container, without using sheet 71*a*, if composition resin material which constitutes the lower solid portion 73 has dampproofing capability and gas cut-off capability.

Figure 28:
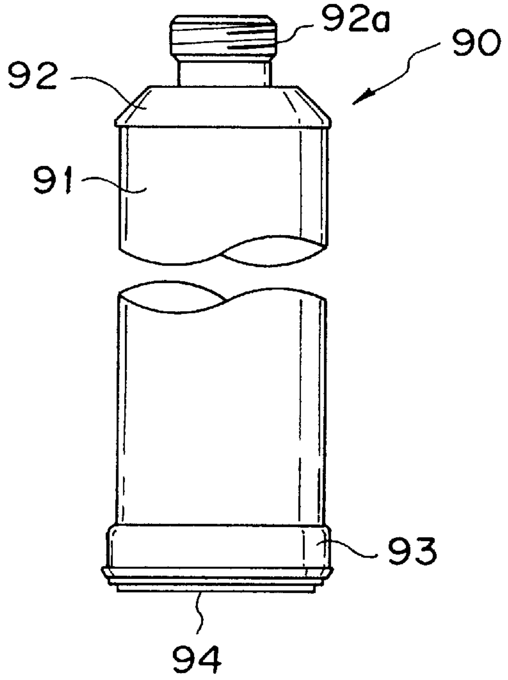
FIG. 28 is a side view of another embodiment of the container by the fifth invention.

An example in case the present invention is applied to a cartridge container for discharge guns is shown in FIG. 28. A cartridge container 90 for discharge guns has the following constitution elements. A main body 91 is formed of plastic lamination film in the shape of a pipe. An upper solid portion 92 is formed on the upper end of main body 91 in one piece, and has a mouth section 92*a*. A ring-like lower solid portion 93 is formed on the lower end of the main body 91 in one piece. A bottom lid 94 can be inserted in the ring-like lower solid portion 93.

Figure 29:
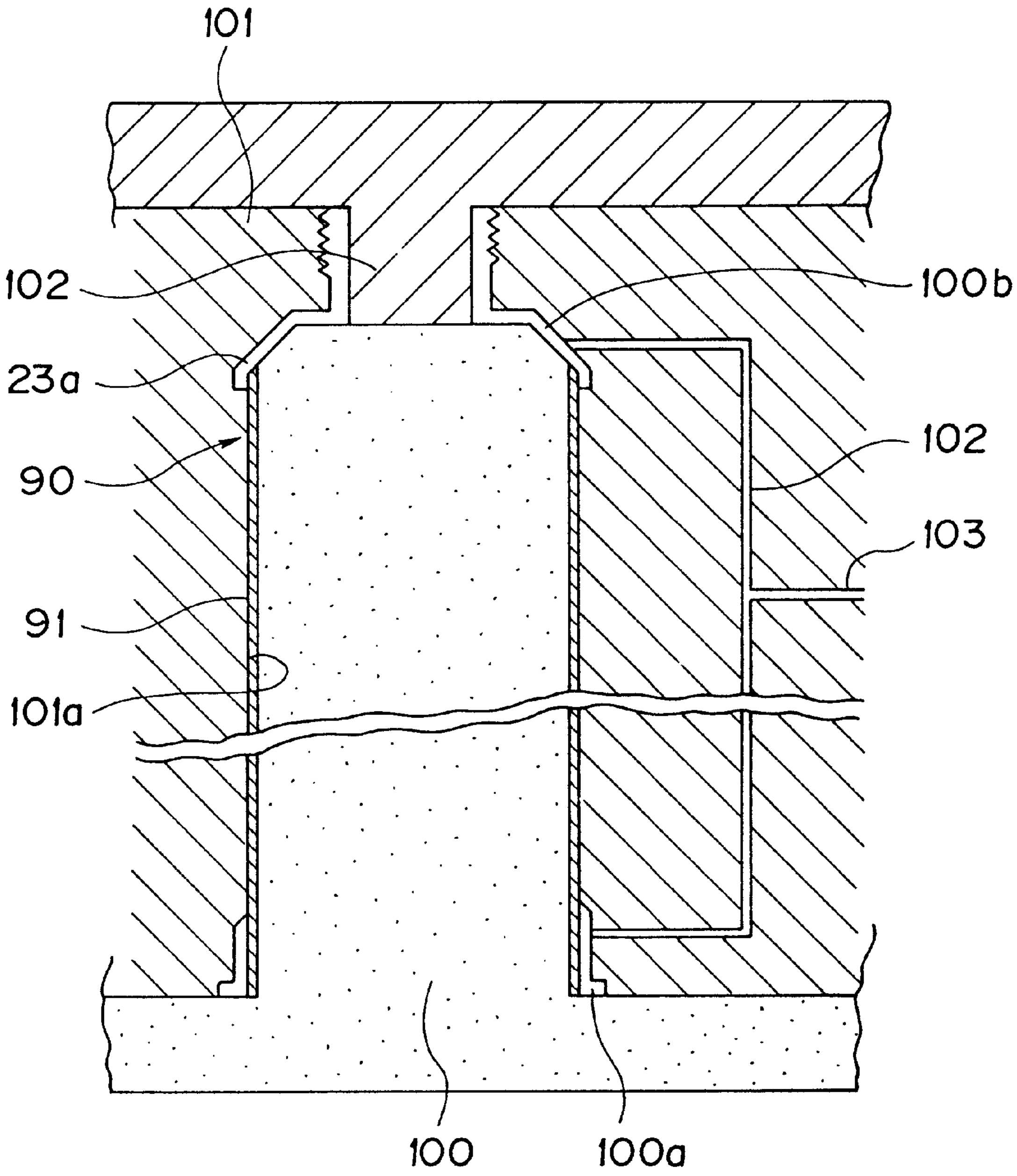
FIG. 29 is a sectional view in which another embodiment of the manufacturing method of the container of the sixth invention is shown.

A manufacturing method of the cartridge container 90 for discharge guns will be explained on the basis of FIG. 29. Plastic lamination film of material which does not react with content filled up and sealing material, is used for the main body 91 of the cartridge container 90 for discharge guns. After plastic lamination film is formed into a cylinder form whose both ends are opened, it is mounted on a mandrel 100 which functions as a die core.

Next, the mandrel 100 covered with the main body 91 formed in the cylinder form, is inserted into a blank 101*a* of a die 101. At this time, a molding space 100*a* having the same form as that of the lower solid portion 93, is formed between the outer circumference surface of the lower end of the main body 91 and the inner circumference side of the lower end of the blank 101*a*.

Next, a spacer 102 is mounted from the upper side of the die 101. At this time, a molding space 100*b* having the same form as that of the upper solid portion 92, is formed between the outer circumference surface of the upper end of the main body 91, the external surface of the upper end of the mandrel 100, the inside wall surface of the upper end of the blank 101*a* and the outer-circumference surface of the spacer 102. The molding space 100*a* and the molding space 100*b* are communicated to each other by a runner 102 formed in the die 100.

Composition resin material like polyethylene resin is poured by insert injection molding means, in molten state, into the molding space 100*a* and the molding space 100*b* through the runner 102 from a gate mouth 103 formed in the die 100, after setting the main body 91 to the die 100. Thereby, the upper solid portion 92 and the lower solid portion 93 are formed in one piece on the main body 91 which forms an intermediate barrel portion. In this manner, the cartridge container 90 for discharge guns having an open bottom end, is manufactured.

Filling of contents, such as adhesives, into the cartridge 90 for discharge guns manufactured as mentioned above, is performed as follows. The cartridge container 90 for discharge guns is mounted on a filling-up machine by holding the mouth section 92*a* of the upper solid portion 92 in the state where the upper solid portion 92 is turned down. The contents discharged from the filling-up machine, are filled into the inside of the main body 91 from the opening portion of the lower solid portion 93. The opening portion of the lower solid portion 93 is closed by inserting the bottom lid 94 to the opening of the lower solid portion 93 of the main body 91 after filling the contents of predetermined amount to the main body 91. This bottom lid 94 functions also as a press plate, which is pressed against an operation section of a discharge gun. Therefore, an installation jig for the cartridge container 90 needs no press plate for pressing the end of the cartridge container. In addition, the air in the internal space of the main body 91 is attracted by vacuum-attracting from the mouth section 92*a* of the upper solid section 92 after inserting the bottom lid 94 into the opening end of the lower solid portion 93 of the main body 91. After this, the contents discharged from a filling-up machine, are filled into the main body 91 from the mouth section 92*a* of the upper solid portion 92. Thereby, the air can be prevented from mixing into the contents in the cartridge container 90.

Figure 30:
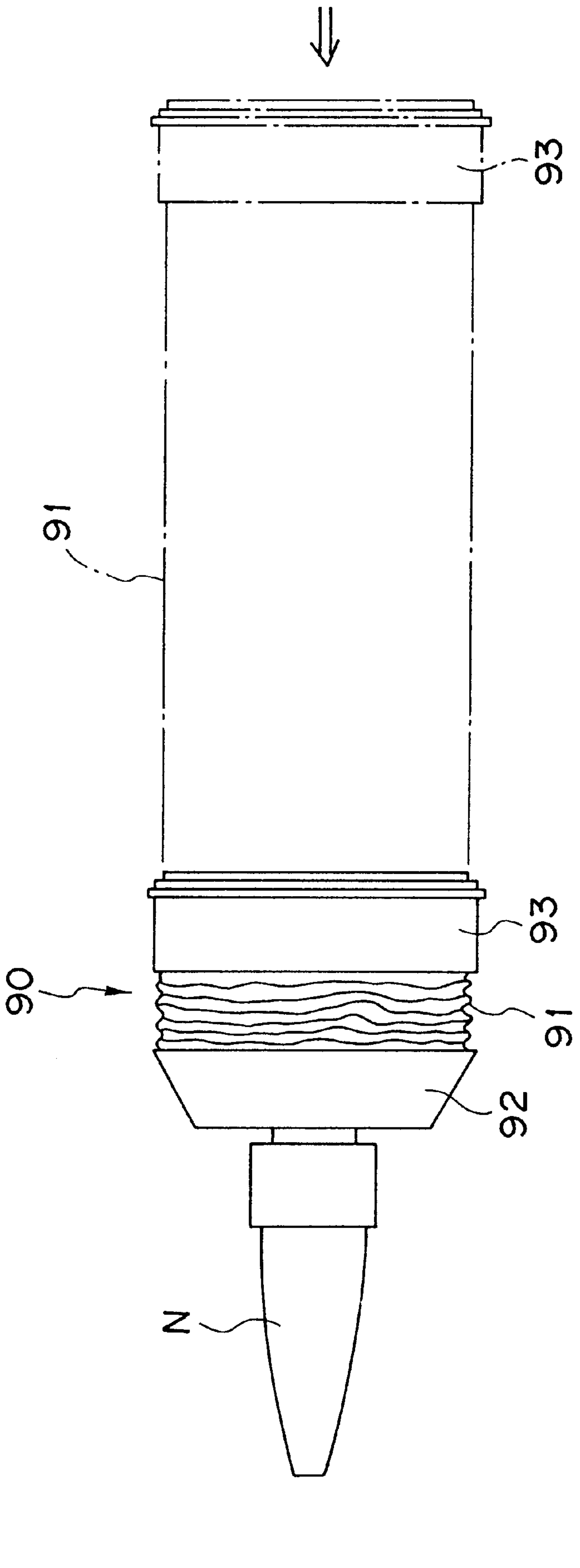
FIG. 30 is a side view in which the state after use of the container of FIG. 28 is shown.

At the time of using the cartridge container 90 for discharge guns, as shown in FIG. 30, the nozzle N is mounted on the mouth section 92*a*, and, by pressing the bottom lid 94 or the lower solid portion 93 in the axial direction, the main body 91 is compressed in the axial direction. And, the contained content in the main body 91 is discharged from the nozzle N.

When all contents in the cartridge container 90 have been discharged, the cartridge container 90 will have become a small lump as indicated by a solid line shown in FIG. 30.

The cartridge container 90 of FIG. 28 is a cartridge container for single liquid type contents, whose main body 91 is formed into a cylinder shape.

Figure 31:
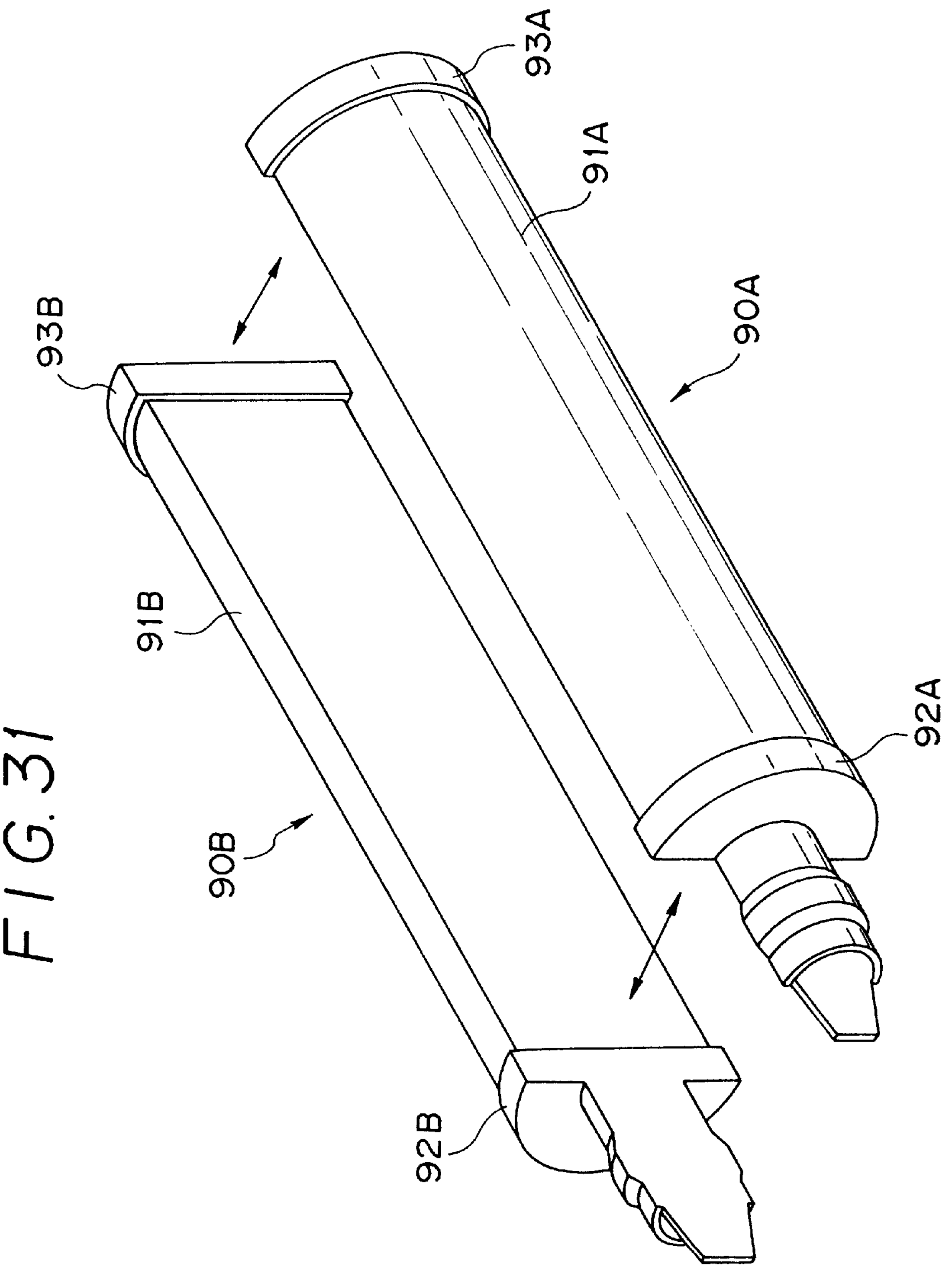
FIG. 31 is a perspective view in which another embodiment of the container of the fifth invention is shown.

Cartridge containers 90A, 90B shown in FIG. 31, are containers for filling separately two or more kinds of contents, which are to be mixed upon usage, such as double liquid type adhesive etc.

These cartridge containers 90A, 90B are constructed such that each of main bodies 91A, 91B, upper solid portions 92A, 92B, and lower solid portions 93A, 93B is formed in a half cylinder shape, respectively. On the whole, each cartridge containers 90A, 90B is constituted in a half-cylinder shape. And, at the time of usage, a cylinder type container on the whole is formed, by bonding each bow-string side of the cartridge containers 90A, 90B with each other.

In addition, a container which has the same constitution as the cartridge container 90 for discharge guns, may be used also as a drink container or a detergent container, by selecting material, shape or size of a main body.

Figure 32:
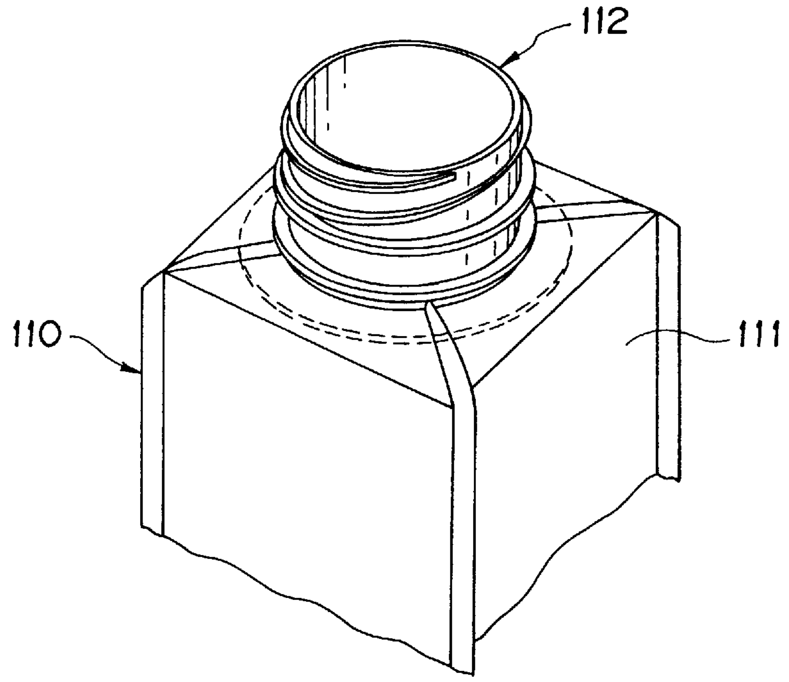
FIG. 32 is a perspective view in which the end of the container by a seventh invention is shown.

An example in case the present invention is applied to a liquid container, is shown in FIG. 32.

In FIG. 32, a pouring opening 112 having such a size that covers most of upper end surface of a main body 111 of a liquid container 110, is attached on the upper end side of the main body 111 by welding means or adhesion means.

Laminated film, which constitutes the main body 111 of the liquid container 110, has a four layer structure that is the same as that shown in FIG. 8. First layer is polyester film (12 micro). Second layer is aluminum foil (9 micro). Third layer is extended nylon film (15 micro). Fourth layer is polyethylene film (150 micro). And, the laminated film has such a structure that it has flexibility and gas barrier capability.

Figure 33:
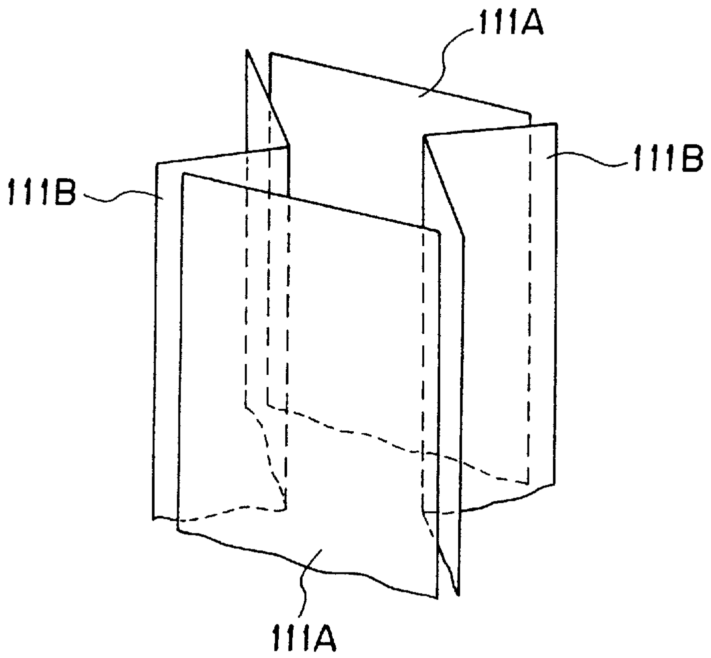
FIG. 33 is a perspective view in which the preparation stage of the manufacturing method of the container of a eighth invention is shown.
Figure 34:
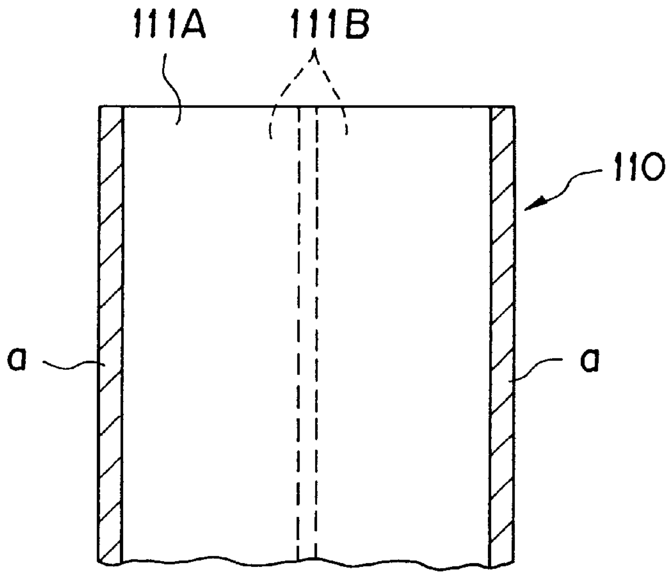
FIG. 34 is an explanatory view in which the first heat-sealing step of the manufacturing method of the container of the eighth invention is shown.
Figure 38:
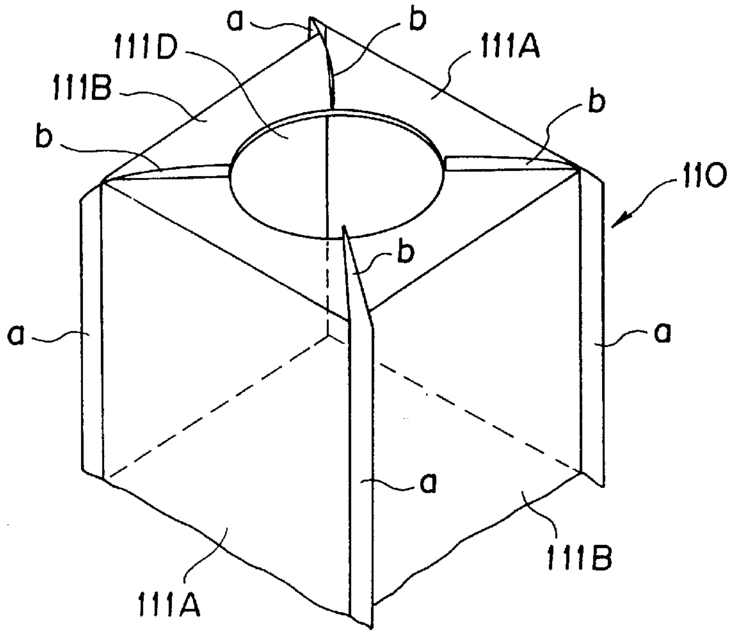
FIG. 38 is a perspective view in which the end of the container main body manufactured by the manufacturing method of the container of the eighth invention is shown.

Manufacturing method of liquid container 110 is shown in FIG. 33 or FIG. 38. Firstly, in FIG. 33, laminated film is cut and formed into a rectangular shape, so that one pair of surface sections 111A, 111A are prepared. One pair of gusset portions 111B, 111B in which central part in width direction is folded, are prepared by cutting laminated film and forming into a rectangular shape. In this case, it is formed so that the width of the surface sections 111A, 111A, and the width of the gusset portions 111B, 111B become almost equal, so that cross-sectional form of the liquid container 110 to be manufactured, substantially becomes a square. And, between the overlapped surface sections 111A and 111A, the gusset-portions 111B, 111B are arranged such that the side ends thereof match the side ends of the surface sections 111A, 111A. Subsequently, as shown in FIG. 34, the gusset type liquid container 110 is formed by heat-sealing each side portions of the surface sections 111A, 111A and the gusset-portions 111B, 111B through ordinary heat seal means.

Figure 35:
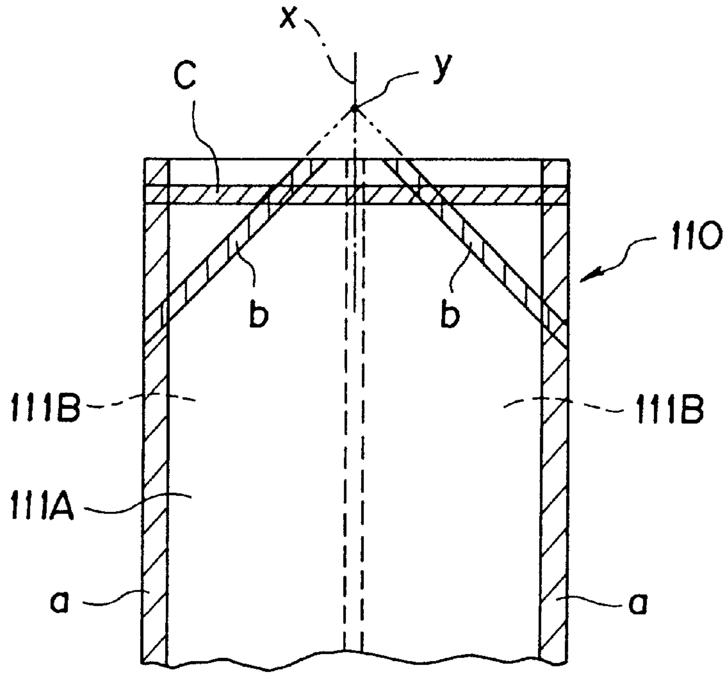
FIG. 35 is an explanatory view in which the second heat-sealing step of the manufacturing method of the container of the eighth invention is shown.

Next, in FIG. 35, V-shaped-heat-sealed-portions b, b are formed at one end of the surface section 111A of the gusset type liquid container 110 so as to spread at angle of about 45 degrees on either side with respect to a position Y, as standard position, which is separated from an end surface on an axis x in the longitudinal direction of the liquid container 110. And, cross-heat-sealed-portions c, c are formed. The cross-heat-sealed-portions c, c cross in the direction which is perpendicular to the axis x of the longitudinal direction of the liquid container 110. Heat seal procedure of FIG. 33 and FIG. 34 may be performed concurrently.

Figure 36:
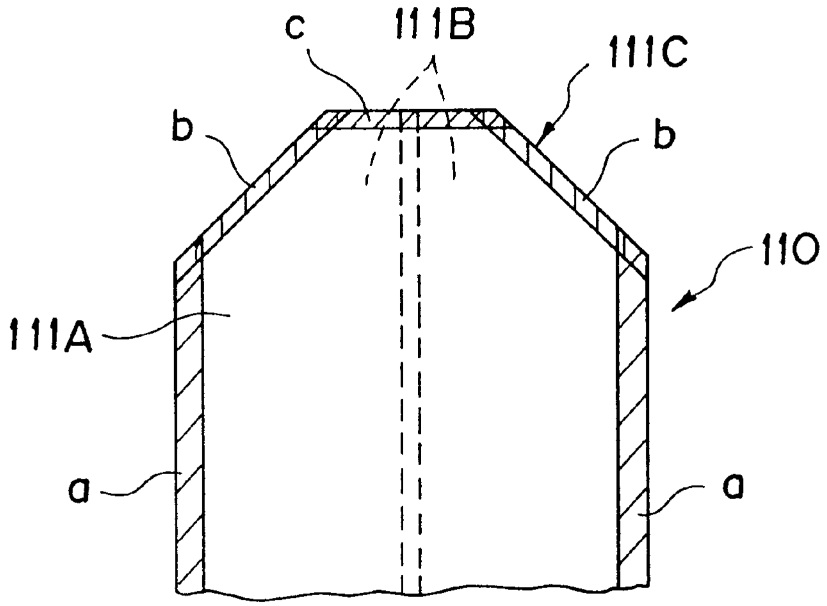
FIG. 36 is an explanatory view in which the cutting step of the manufacturing method of the container of the eighth invention is shown.
Figure 37:
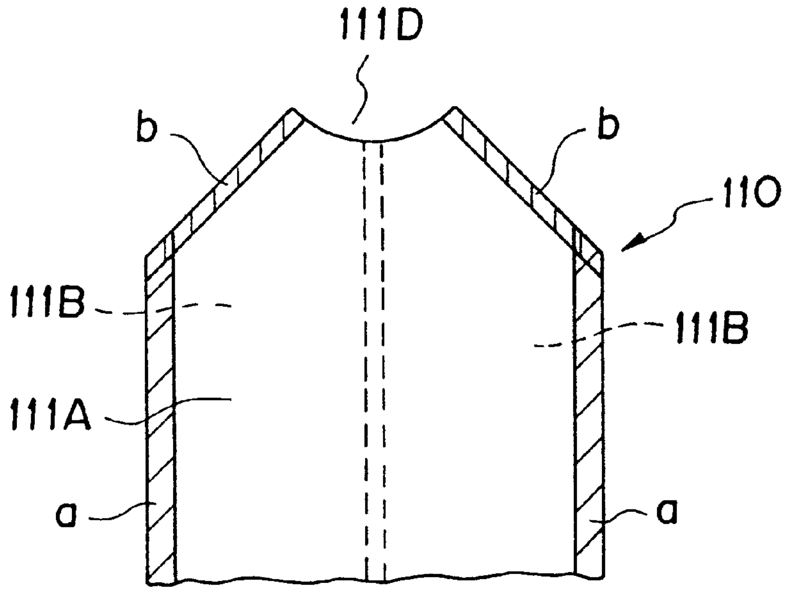
FIG. 37 is an explanatory view in which the end opening step of the manufacturing method of the container of the eighth invention is shown.

Subsequently, the portions located more end than the V-shaped-heat-sealed-portions b, b and the cross-heat-sealed-portions c, c of the liquid container 110, are cut off in FIG. 36. Thereby, a trapezoid-heat-sealed-portion 111C is formed at the end of the liquid container 110. Subsequently, a zone including the heat-sealed-portion c of the central part of the trapezoid-heat-sealed-portion 111C is cut in FIG. 37. Thereby, an opening-portion 111D is formed. The end of the liquid container 110 which is formed in this manner, is shown in FIG. 38.

Next, the pouring opening 112 is arranged at the opening-portion 111D of the liquid container 110. As shown in FIG. 32, the pouring opening 112 is installed to the opening-portion 111D of the liquid container 110 by welding means or adhesion means.

Following explanation is explanation about an embodiment of an installation jig of the present invention, to install a cartridge container for discharge guns.

Figure 1:
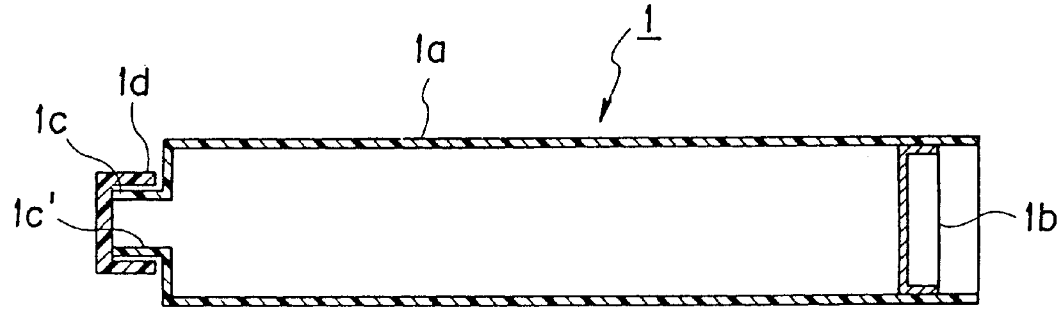
FIG. 1 PRIOR ART
FIG. 1 is a side cross sectional view of one example of a conventional cartridge container for discharge guns.
Figure 2:
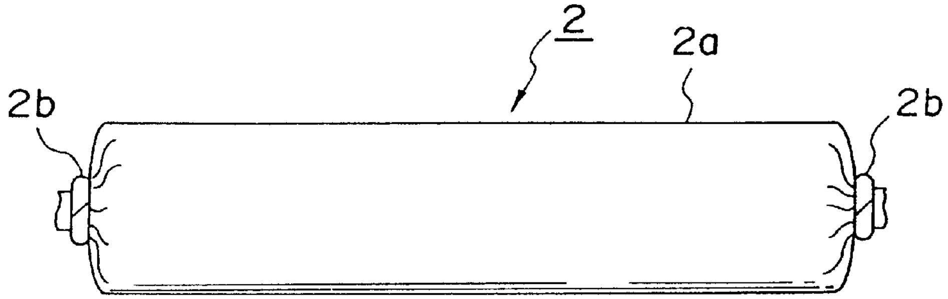
FIG. 2 PRIOR ART
FIG. 2 is a side view of another example of a conventional cartridge container for discharge guns.
Figure 39:
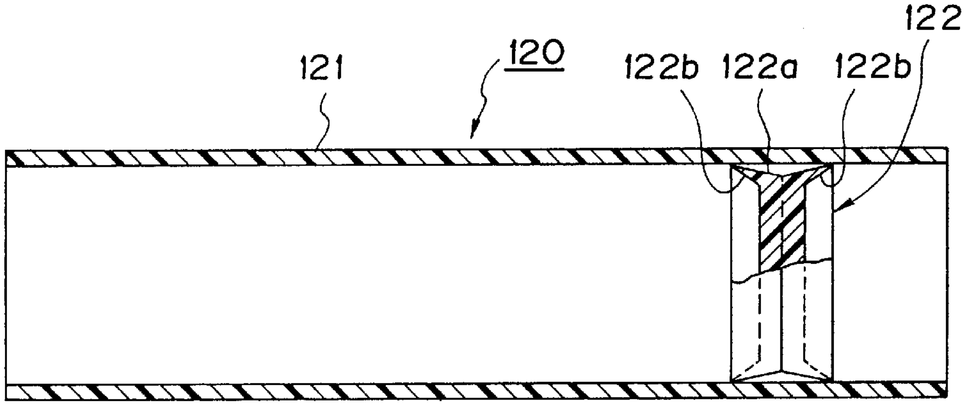
FIG. 39 is a side cross sectional view in which one embodiment of the installation jig by a ninth invention is shown.

An installation jig 120 shown in FIG. 39 is a jig for the cartridge container 2 of FIG. 2, the cartridge container 10 of FIG. 6, the cartridge containers 30, 30' of FIGS. 10 to 12, or the cartridge container 40 of FIG. 13.

The installation jig 120 has a jig main body 121 of hollow-like cylinder, and a piston 122 inserted inside of the jig main body 121 slidably in FIG. 39.

In order to make the rigidity high, the jig main body 121 is formed by metal, hard resin, etc. It is desirable to form it from resin from viewpoint of reducing weight. In this case, resin, such as polyethylene, is used, for example. Moreover, in this embodiment, a cross-sectional form of the jig main body 121 is circular. However, in case that the cross-sectional form of a support section of a discharge gun used or a cartridge container used is not circular, the cross-sectional form of the jig main body 121 may be formed in a shape corresponding to it. Likewise, the full length of the jig main body 121 is formed.

On the other hand, the piston 122 is formed from metal, hard resin, etc. However, from view point of reducing weight, the piston 122 may be preferably formed from the same resin as the jig main body 121. Corresponding to cross-sectional form of the jig main body 121, the piston 122 is formed in a board-like shape having a circular cross-section. Of course, in case that the jig main body 121 is not circular, the piston 122 may be formed in the shape corresponded to it.

Outer diameter of the piston 122 is slightly larger than the inner diameter of the jig main body 121. The piston 122 is inserted slidably in the jig main body 121. An escape section 122*a*, whose outer diameter becomes gradually smaller toward to a center from both ends, is formed on the outer-circumference section of the piston 122. Thus, only both ends of the piston 122 contact the inner circumference surface of the jig main body 121. Friction resistance, which acts between the piston 122 and the jig main body 121, does not become excessive by keeping the central part of the outer-circumference section in a non-contacting state. In addition, the piston 122 is stopped at fixed position, due to friction resistance between the piston 122 and the jig main body 121.

Moreover, ring-like projection sections 122*b*, 122*b* are formed on the peripheral portion of the both end surfaces of the piston 122. The height of the projection sections 122*b*, 122*b* becomes gradually higher as it extends outwardly in the radial-direction of the piston 122. In addition, in this embodiment, the height of the projection section 122*b* becomes higher at a constant rate. However, the increasing rate of height may become higher gradually. Alternatively, it may become lower gradually, conversely.

Figure 4:
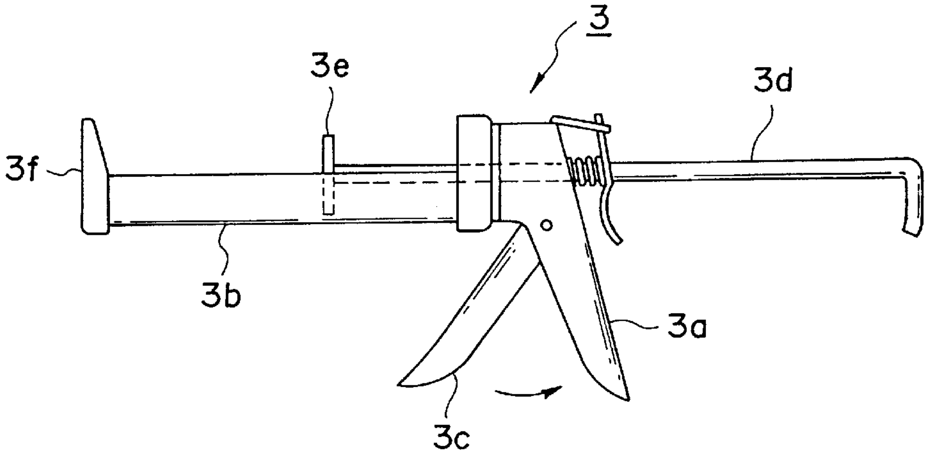
FIG. 4 PRIOR ART
FIG. 4 is a side view of a conventional discharge gun.
Figure 5:
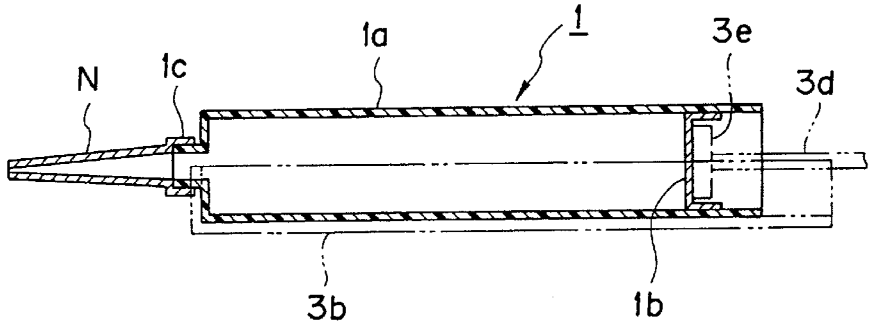
FIG. 5 PRIOR ART
FIG. 5 is a side cross sectional view in the state where a conventional cartridge container in installed to the discharge gun.
Figure 40:
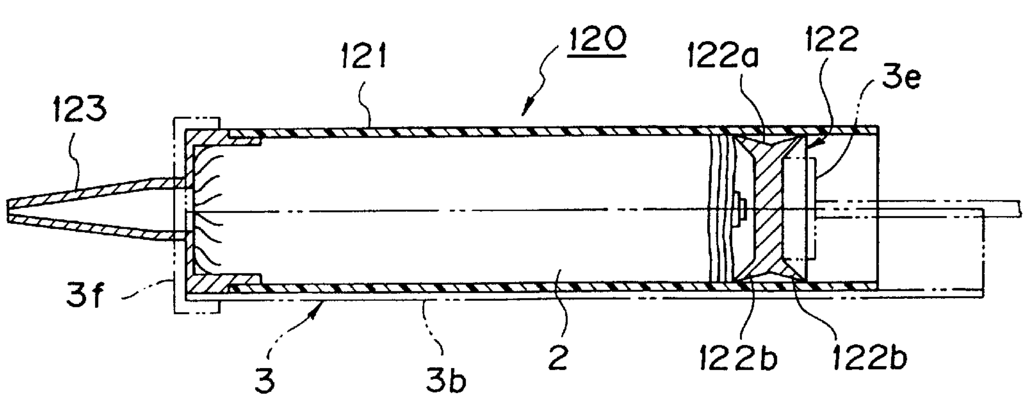
FIG. 40 is a side cross sectional view showing the state where the installation jig of the embodiment is used for the discharge gun.

In case that the cartridge container 2 shown in FIG. 2, for example, is mounted onto the support section 3*b* of the discharge gun 3 of FIG. 4 by the installation jig 120 of the above-mentioned constitution, one end of the cartridge container 2 is excised and opened as shown in FIG. 40. A nozzle 123 is mounted in the opened end of the cartridge container 2. And, the cartridge container 2 onto which the nozzle 123 is mounted, is inserted into the jig main body 121. At this time, the end of the nozzle 123 is fixed to the end of the jig main body 121.

The installation jig 120 into which the cartridge container 2 is inserted as mentioned above, is installed on the support section 3*b* in a state where the nozzle 123 is fixed to the end board 3*f* of the discharge gun 3. After this, when the piston 122 moves forward by being pushed by the press plate 3*e* of the discharge gun 3, the contents filled in the cartridge container 2 are discharged from the nozzle 123.

In addition, the piston 122 is retreated and is extracted from the jig main body 121, after discharging all contents from the cartridge container 2. Thereafter, the cartridge container 2 is removed from the discharge gun 3 with the installation jig 123. And, used cartridge container 2 is discarded. And, new cartridge container 2 is installed to the installation jig 120. In this case, the piston 122 is located on a side opposite to an original position. However, the piston 122 is pushed back to the original position by inserting new cartridge container 2 from the opposite side with respect to the jig main body 100. Therefore, no special operation to return the piston 122 to the original position is necessary.

The circumference of the cartridge container 2 is restrained by the jig main body 121 during usage of the cartridge container 2. Therefore, the part of the cartridge container 2 is prevented from being torn.

Moreover, while the contents are discharged, the cartridge container 2 is crushed gradually from the side end of the piston 122. At this time, since that the ring like projection section 122*b* forms a recessed space to receive the tail end of the cartridge container 2, the cartridge container 2 is reliably folded up in shape of an accordion. Especially, the projection section 122*b* is expanded gradually outward, in this embodiment. Thus, the cartridge container 2 is very reliably folded up. Therefore, the cartridge container 2 after usage becomes a very small lump. Moreover, the contents of the cartridge container 2 are almost used up, which is efficient.

Moreover, a front projection section 122*b* is expanded obliquely and forwardly to form an obtuse angle. Thus, an angle between the projection section 122*b* and the inner surface of the jig main body 121 corresponding to the cartridge container 2. Thus, the tail end of the cartridge container 2 moves into the center of the recess formed by the projection section 122*b* along the inclined surface of the projection section 122*b*. Therefore, a part of the film of the cartridge container 2 is not intruded or pinched between the piston 122 and the inner surface of the jig main body 121. Especially, in this embodiment, the escape portion 122 is formed at the outer circumference surface of the piston 122, and both ends of the piston 122 certainly contact the inner sirface of the jig main body 121. Thus, intrusion of the film is much more certainly prevented.

Furthermore, the press-plate 3*e* enters the inside of the jig main body 121 during usage of the discharge gun 3, as clearly shown in FIG. 40. Thus, even when the upper and lower sides of the discharge-gun 3 become reverse temporarily, the installation jig 120 does not drop out of the discharge gun 3. Therefore, it is certainly prevented that the cartridge container 3 inserted in the jig main body 121, drops out.

The cartridge container 10 of FIG. 6, the cartridge containers 30, 30' of FIGS. 10 to 12, or the cartridge container 40 of FIG. 13, is mounted to the installation jig 120 as follows.

Namely, the reinforcing member in cartridge containers 10, 30, 30', is mounted at one end of the main body which has pliability. A nozzle section is attached in this reinforcing member, respectively. Therefore, each of cartridge containers 10, 30, 30', or 40 is inserted in the installing member 120 from its tip side (discharging side), after attaching the nozzle to the reinforcing member, respectively. And, it is installed to the discharge gun 3 in the same manner as the above-mentioned embodiment.

Figure 41:
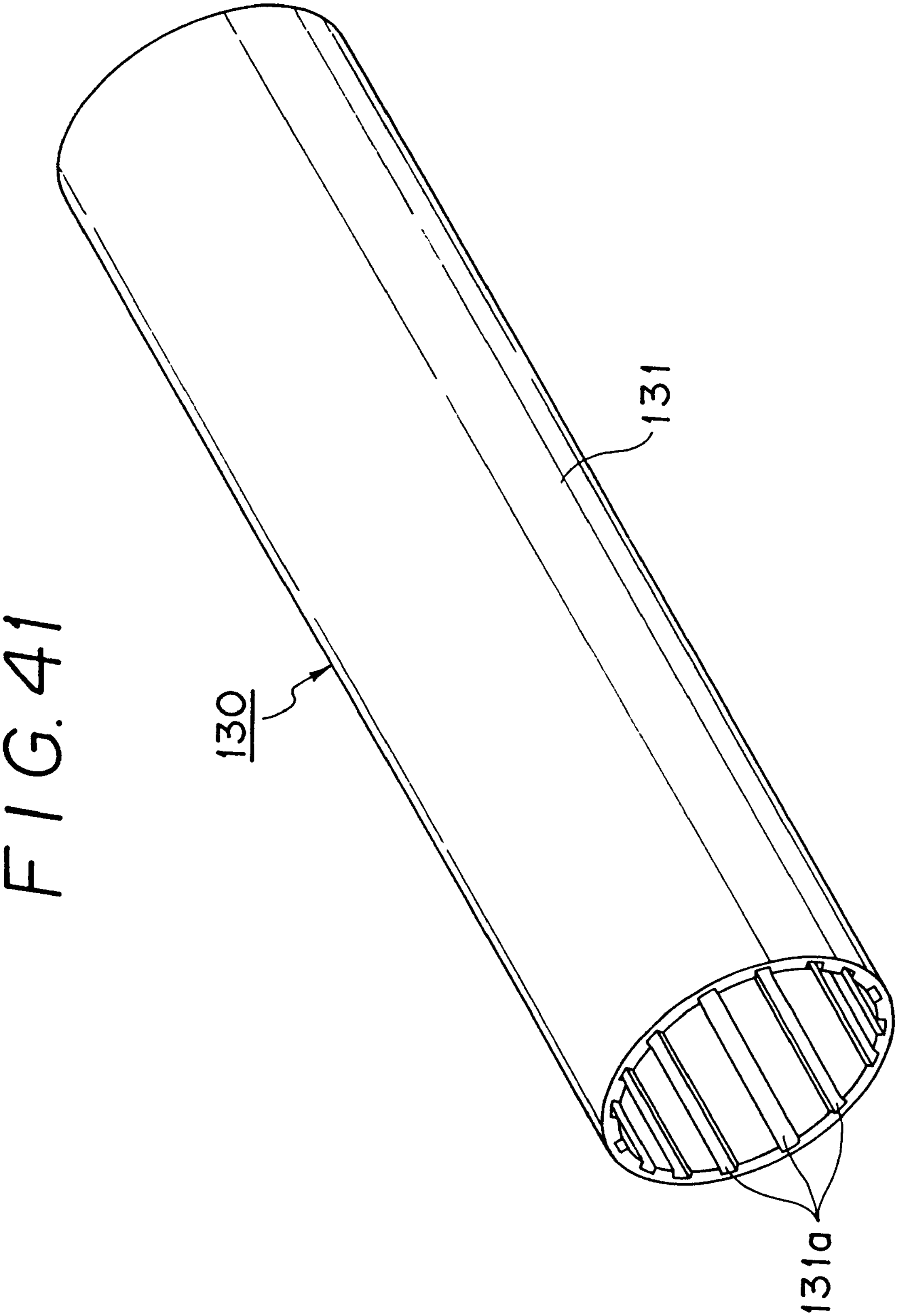
FIG. 41 is a perspective view in which one embodiment of the installation jig of a tenth invention is shown.

Another embodiment of an installation jig is shown in FIG. 41. In FIG. 41, a jig main body 131 of an installation jig 130 is formed in a shape of hollow cylinder from high rigidity material as in the case of the installation jig 120 of FIG. 39. A plurality of grooves are formed on the inner circumference of the front end of the jig main body 131 at regular intervals, which extends in the axial direction from the front end surface of the jig main body 131.

Figure 42:
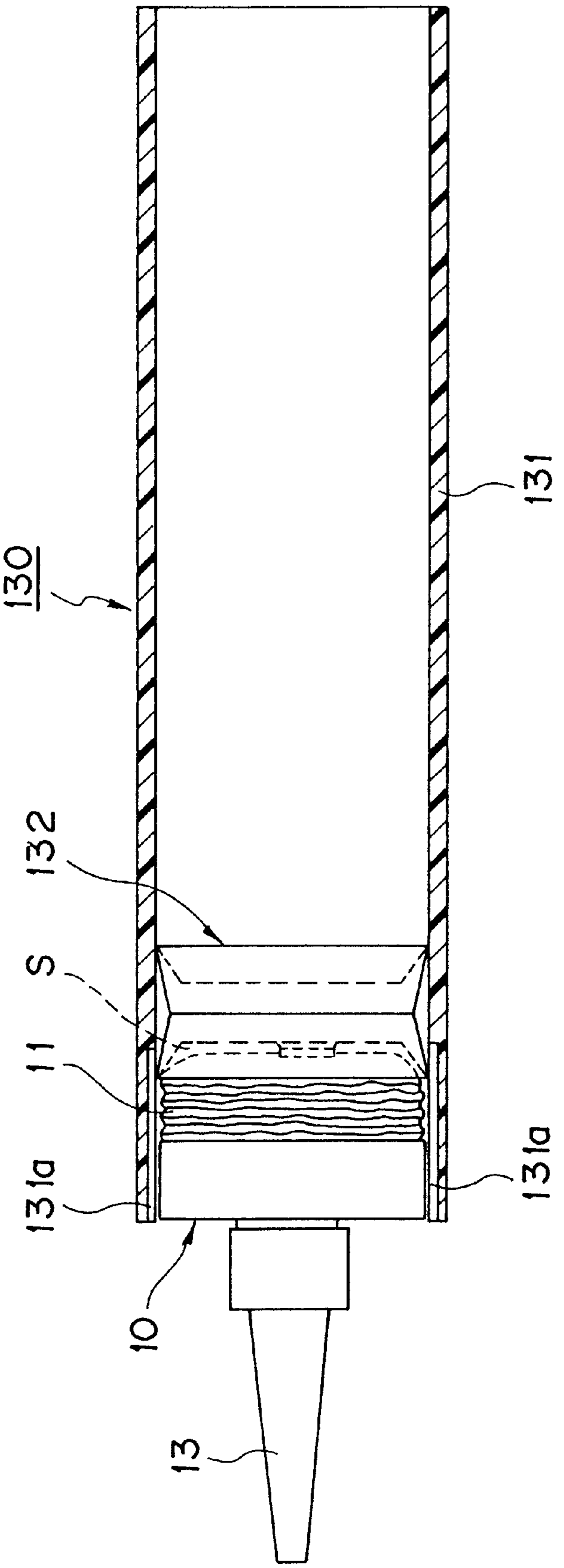
FIG. 42 is a side cross sectional view showing the state where the container is installed to the installation jig of FIG. 41 and compressed.

The cartridge container 10 (same as the cartridge containers 30, 30' of FIGS. 10 to 12, and the cartridge container 40 of FIG. 13) of FIG. 6 is inserted from the front end side or the back end side of the installation jig 130, into the inner side, and is installed. And, the cartridge container 10 is installed to the discharge gun 3 of FIG. 4 with the installation jig 130 in the same manner as the installation jig 120 of FIG. 39. And, by advancing of the piston 132, the main body 11 is compressed as shown in FIG. 42. And, it becomes a small lump when the discharging of contained content finishes. At this time, a space S formed between the back end of the main body 11, and the piston 132, is communicated by grooves 131*a* with the atmosphere. And, the cartridge container 10 which has finished the discharging of the contained content, is taken out from the front side of the installation jig 130, and is exchanged.

When there are no grooves, the space S formed between the back end of the main body 11 and the piston 132, forms a seal. Thus, the nozzle 13 is pulled, and when the compressed cartridge container 10 is taken out of the installation jig 130, it becomes hard to separate the back end of the main body 11 from the piston 132. There is a possibility that the main body 11 compressed may be extended.

However, air is supplied to the space S by the grooves 131*a*, according to the installation jig 130, when extraction of the cartridge container 10 is performed. Thus, it is easy to separate the back end of the main body 11 and the piston 132. Moreover, contact area of the outer-circumference surface of the compressed main body 11 and the inner circumference surface of the installation jig 130 is reduced by formation of the grooves 131*a*. Thus, it becomes easy to take out the cartridge container 10 as a small lump.

Figure 43:
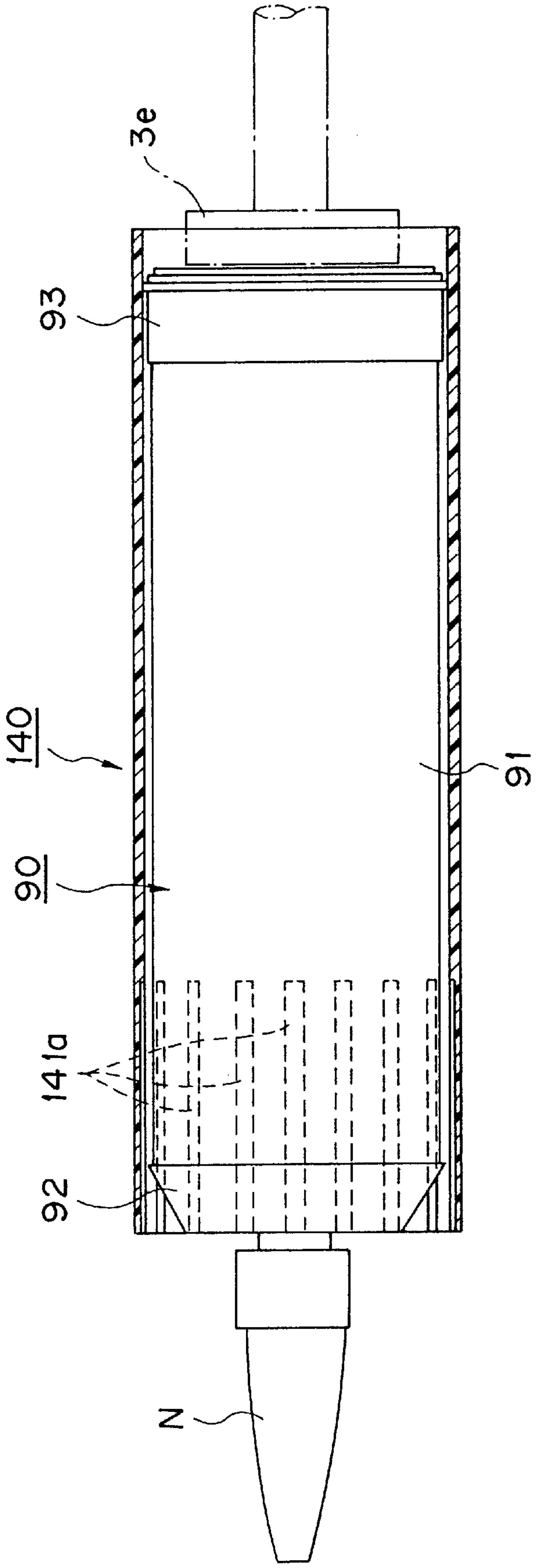
FIG. 43 is a side cross sectional view of another embodiment of the installation jig by the tenth invention.

FIG. 43 shows an installation jig for the cartridge container 90 of FIG. 28, or the cartridge containers 90A, 90B of FIG. 31.

An installation jig 140 has almost the same constitution as the installation jig 130 of FIG. 42. However, the lower solid portion 93 or the bottom lid 94 attached on the lower solid portion 93 of the cartridge container 90 (as in the case of the cartridge containers 90A, 90B), plays the same function as the piston 132 of the installation jig 130 of FIG. 42. Therefore, the piston is not prepared in the installation jig 130.

Figure 44:
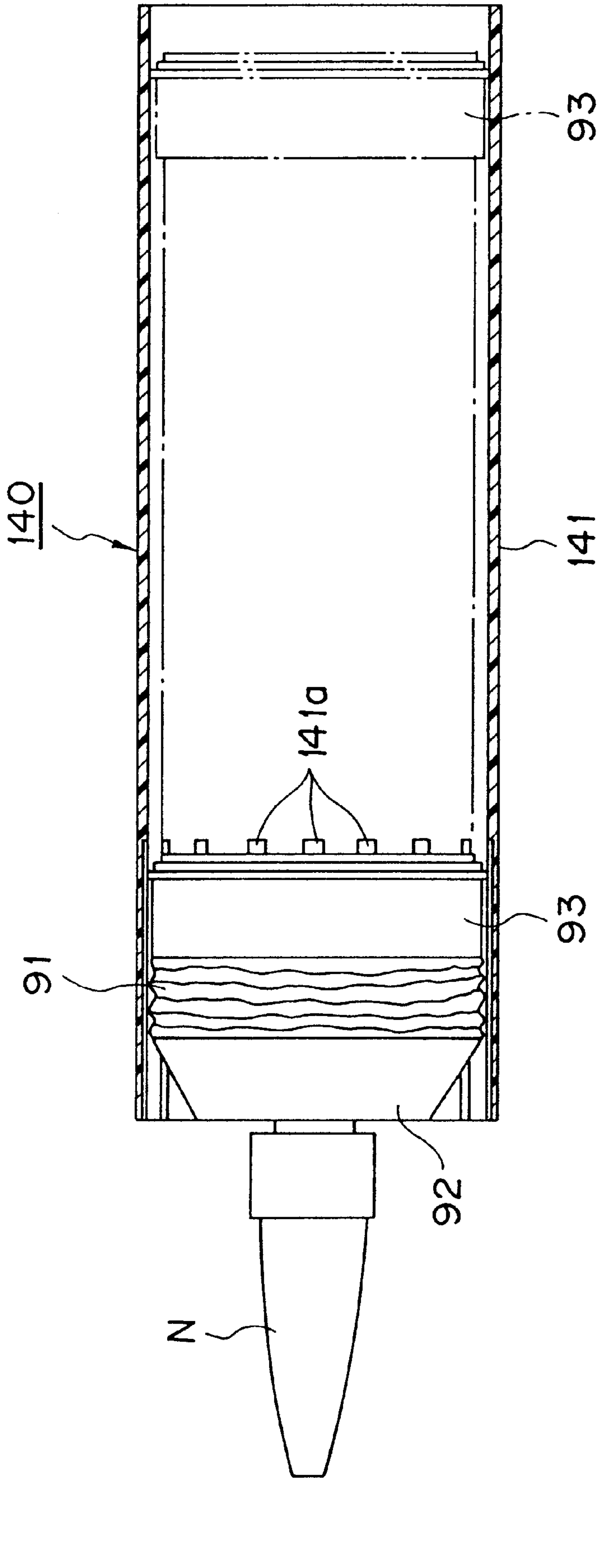
FIG. 44 is a side cross sectional view showing the state where the container after use is taken out from the installation jig of FIG. 43.

As shown in FIG. 43, the cartridge container 90 is installed to the installation jig 140. And, as shown in FIG. 44, the cartridge container 90 whose main body section 91 is compressed, and became a small lump when the discharging of contents is finished, is taken out from the front end side of the installation jig 130, and is exchanged. At this time, contact area of the outer circumference surface of the compressed main body 91 and the inner circumference surface of the installation jig 140, is reduced by formation of grooves 141*a*. For this reason, it becomes easy to take out the cartridge container 90 as a small lump.

The side surfaces on the bowstring side of the half-cylinder type cartridge-containers 90A, 90B of FIG. 31, are matched to each other so as to be formed into a cylinder shape, and installed to the installation jig 140 in the same manner as the case of the cartridge container 90.

Figure 45:
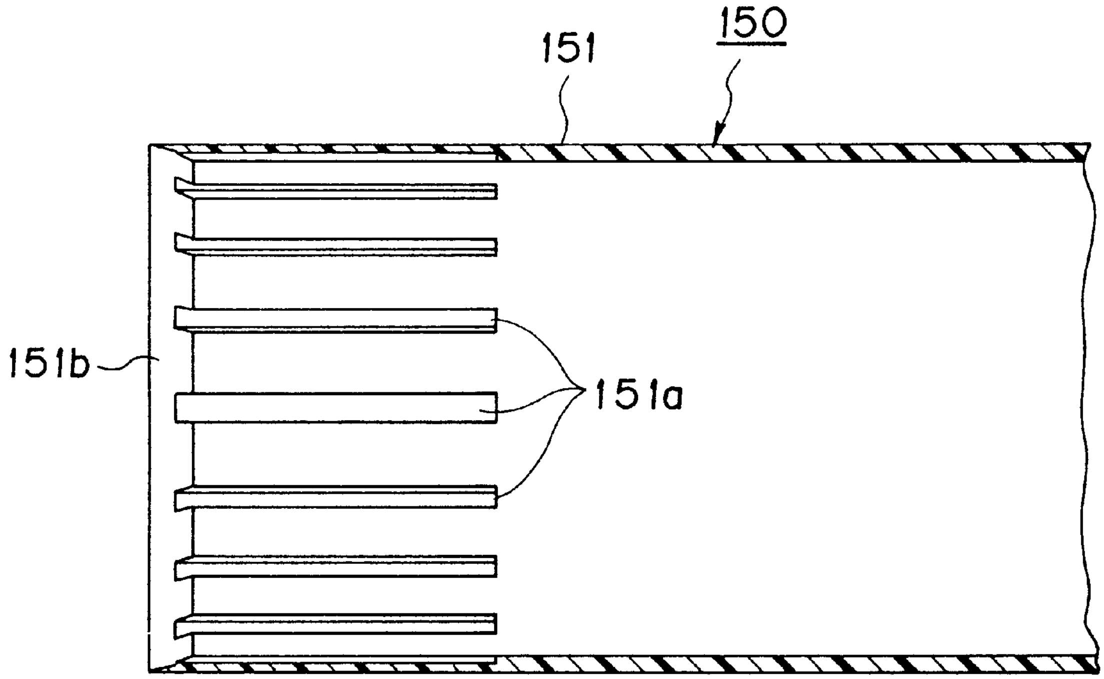
FIG. 45 is a side cross sectional view in which another embodiment of the installation jig by the tenth invention is shown.

Another embodiment of an installation jig is further shown in FIG. 45. A plurality of grooves 151*a* are formed at the front end of a jig main body 151 of an installation jig 150 at regular intervals, which extend in an axial direction from the front end surface of the jig main body 151 in the same manner as the case of the installation jig 130 of FIG. 41 or the installation jig 140 of FIG. 43. Further, beveling section 151*b* is formed inside of the tip section of the jig main body 151.

The jig main body 151 is used in the same manner as the installation jigs 130 and 140. However, when each cartridge container is inserted into the jig main body 151 from the front or back portion, the cartridge container can be smoothly inserted into the jig main body 151 by the inclination surface of the beveling section 151*b*.

Each of above-mentioned explanations is an explanation about a case that a cartridge container is compressed by a press plate of a discharge gun. However, the cartridge container can be compressed by compressed air.

What is claimed is:

1. A method for manufacturing a container comprising the steps of:

covering an intermediate barrel portion having a tubular shape and formed of flexible film on a mandrel that functions as a die core;

installing the mandrel covered with the intermediate barrel portion to an upper die and a lower die;

one end of the intermediate barrel portion covering said mandrel being covered with the flexible film formed from the same material as the intermediate barrel portion;

injecting molten polymer material by insert injection molding means into said upper die and lower die; and forming an upper solid portion and a lower solid portion integrally at opposite ends of the intermediate barrel portion.

2. A method for manufacturing a container comprising the steps of:

covering an intermediate barrel portion having a tubular shape and formed of a flexible film on a mandrel that functions as a die core;

installing the mandrel covered with said intermediate barrel portion to an upper die and a lower die;

injecting molten polymer material by insert injection molding means into said upper die and lower die; and forming an upper solid portion and a lower solid portion integrally at opposite ends of said intermediate barrel portion when said upper solid portion is formed by insert injection molding means; wherein the upper solid portion having a hollow cylindrical opening section including a communication aperture for communicating with an inside of the intermediate barrel portion with an external Part of the intermediate barrel portion is integrally formed such that said hollow cylindrical opening section is coaxial with said intermediate barrel portion.

* * * * *

UNITED STATES PATENT AND TRADEMARK OFFICE

CERTIFICATE OF CORRECTION

PATENT NO. : 5,993,720

DATED : November 30, 1999

INVENTOR(S) : Ritaro KONUMA and Yoji TANAKA

It is certified that error appears in the above-identified patent and that said Letters Patent is hereby corrected as shown below:

Title page, [30] Foreign Application Priority Data, change "4-92239" to --4-92269--; and change "Apr. 15, 1993" to --Apr. 16, 1993--.

Signed and Sealed this

Twentieth Day of June, 2000

Attest:

Q. TODD DICKINSON

*Attesting Officer*

*Director of Patents and Trademarks*